US008726401B2

(12) United States Patent  
Hikichi et al.

(10) Patent No.: US 8,726,401 B2  
(45) Date of Patent: May 13, 2014

(54) DATA TRANSMISSION APPARATUS, CONTROL METHOD THEREFOR, AND IMAGE INPUT/OUTPUT APPARATUS

(75) Inventors: Yukiyoshi Hikichi, Tokyo (JP); Hiroshi Uchikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/444,960

(22) Filed: Apr. 12, 2012

(65) Prior Publication Data

US 2012/0198561 A1 Aug. 2, 2012

Related U.S. Application Data

(63) Continuation of application No. 11/535,310, filed on Sep. 26, 2006, now Pat. No. 8,181,256.

(30) Foreign Application Priority Data

Sep. 30, 2005 (JP) ................................. 2005-288154

(51) Int. Cl.  
*G06F 7/04* (2006.01)  
*G06F 15/16* (2006.01)

(52) U.S. Cl.  
USPC ............................................ 726/26; 709/206

(58) Field of Classification Search  
USPC ............................................ 726/26; 709/206  
See application file for complete search history.

(56) References Cited

U.S. PATENT DOCUMENTS

| | | | |
|---|---|---|---|
| 5,095,445 A | 3/1992 | Sekiguchi | 709/246 |
| 5,513,126 A | 4/1996 | Harkins et al. | 364/514 A |
| 6,411,393 B1 | 6/2002 | Wakasugi | 358/1.15 |
| 6,592,212 B1 | 7/2003 | Kakutani | 347/86 |
| 6,804,021 B1 | 10/2004 | Yoshida | 358/1.15 |
| 7,092,129 B2 | 8/2006 | Oobayashi | 358/402 |
| 7,171,682 B2 * | 1/2007 | Katada et al. | 726/11 |
| 7,324,223 B1 | 1/2008 | Mori | 358/1.15 |
| 7,487,233 B2 | 2/2009 | Iwamoto et al. | 709/223 |
| 7,545,525 B2 | 6/2009 | Idehara | 358/1.15 |
| 7,710,596 B2 * | 5/2010 | Shibao | 358/1.9 |
| 8,181,256 B2 * | 5/2012 | Hikichi et al. | 726/26 |
| 2001/0000027 A1 | 3/2001 | Collard et al. | 399/398 |
| 2001/0047442 A1 * | 11/2001 | Oomori | 710/104 |
| 2001/0056550 A1 | 12/2001 | Lee | 726/11 |
| 2002/0021791 A1 | 2/2002 | Heilmann et al. | 379/189 |
| 2002/0057462 A1 | 5/2002 | Wu et al. | 358/402 |
| 2002/0188645 A1 | 12/2002 | Uchikawa | 709/100 |
| 2003/0093670 A1 | 5/2003 | Matsubayashi et al. | 713/168 |
| 2004/0046972 A1 * | 3/2004 | Shibao | 358/1.1 |
| 2004/0212841 A1 * | 10/2004 | Endo | 358/403 |

(Continued)

FOREIGN PATENT DOCUMENTS

| | | |
|---|---|---|
| CN | 1475950 A | 2/2004 |
| CN | 1691726 A | 11/2005 |

(Continued)

*Primary Examiner* — Techane Gergiso  
(74) *Attorney, Agent, or Firm* — Fitzpatrick, Cella, Harper & Scinto

(57) ABSTRACT

According to the present invention, a data transmission apparatus capable of transmitting data by using a plurality of transmission media, comprises an authority storage unit, adapted to store authority information representing use authority to use each transmission medium by each user; and a transmission control unit, adapted to, in transmitting data, restrict data transmission to a destination corresponding to a transmission medium for which a current user does not have the use authority.

12 Claims, 26 Drawing Sheets

(56) References Cited

U.S. PATENT DOCUMENTS

| | | | |
|---|---|---|---|
| 2005/0005047 A1 | 1/2005 | Keeney et al. | 710/100 |
| 2005/0031107 A1 | 2/2005 | Fotta | 379/200 |
| 2005/0039011 A1 | 2/2005 | Kagawa | 713/170 |
| 2005/0097171 A1* | 5/2005 | Hikichi | 709/204 |
| 2005/0136949 A1* | 6/2005 | Barnes | 455/461 |
| 2005/0188226 A1 | 8/2005 | Kasatani | 713/201 |
| 2005/0273620 A1 | 12/2005 | Kawabata et al. | 713/182 |
| 2006/0068797 A1* | 3/2006 | Iinuma et al. | 455/445 |
| 2006/0106534 A1* | 5/2006 | Kawamata et al. | 701/208 |
| 2006/0129587 A1* | 6/2006 | Renfro et al. | 707/102 |
| 2006/0155803 A1* | 7/2006 | Muramatsu et al. | 709/203 |
| 2006/0253536 A1 | 11/2006 | Fujiwara et al. | 709/206 |
| 2007/0291322 A1* | 12/2007 | Hanafusa | 358/402 |

FOREIGN PATENT DOCUMENTS

| | | |
|---|---|---|
| EP | 1553525 A2 | 7/2005 |
| JP | 63-232745 | 9/1988 |
| JP | 2002-171331 | 6/2002 |
| JP | 2002-185743 | 6/2002 |
| JP | 2003-333241 | 11/2003 |
| JP | 2004-253998 A | 9/2004 |
| JP | 2005-045759 | 2/2005 |
| JP | 2005-157770 A | 6/2005 |
| RU | 2208834 | 7/2003 |
| RU | 2258010 | 8/2005 |
| WO | WO 98/54648 | 12/1998 |

\* cited by examiner

FIG. 8

EMAIL

PLEASE INPUT ACCESS NUMBER WITH TEN-KEY PAD.

1

PLEASE LEAVE FIELD BLANK IF NO ACCESS NUMBER IS SET.

CANCEL | ▼ RETURN | OK

SYSTEM STATUS / STOP ▲

FIG. 10

| | DESTINATION TABLE | | NUMBER OF DESTINATIONS : 4 |
|---|---|---|---|
| | | | ■ DESTINATION TYPE |
| | | | ● ALL ▶ |
| ✓ | TYPE | NAME | DESTINATION |
| ☑ | 🗇 | fax address | 012345678 |
| ☑ | ▭ | email address | email@XYZ.jp |
| ☑ | 🗇 | i-fax address | i-fax@XYZ.jp |
| ☑ | 🗇 | ftp address | ftphost |

◁ 1/1 ▷

[A-C] [D-F] [G-I] [J-L] [M-O] [P-R] [S-U] [V-X] [Y-Z] [0-9] [ALL]

DETAILS / EDIT ▲

[CANCEL]  [OK] ↵

■ SYSTEM STATUS / STOP ▲

FIG. 12

| DEPARTMENT ID | PASSWORD | PLANE COUNT RESTRICTION | | |
|---|---|---|---|---|
| | | TOTAL PRINT | TOTAL COLOR PRINT | TOTAL MONOCHROME PRINT |
| 0000001 | 0000001 | — | — | — |

REGISTER  EDIT  ERASE

RESTRICT FUNCTION

CLOSE 1201, 1202, 1203

SYSTEM STATUS / STOP

FIG. 13

REGISTRATION

PLEASE INPUT DEPARTMENT ID AND PASSWORD WITH TEN-KEY PAD.

DEPARTMENT ID  0000000

PASSWORD  0000000

ON/OFF OF RESTRICTION AND SETTING OF PLANE COUNT RESTRICTION

CANCEL

OK

SYSTEM STATUS / STOP

FIG. 15

| ✓ | TYPE | NAME | DESTINATION |
|---|---|---|---|
| ☐ | 📠 | fax address | 012345678 |
| ☐ | ✉ | email address | email@XYZ.jp |
| ☐ | 📠 | i-fax address | i-fax@XYZ.jp |
| ☐ | 📁 | ftp address | ftphost |
| ☐ | 👥 | group address | FOUR DESTINATIONS |

DESTINATION TABLE — NUMBER OF DESTINATIONS : 0

■ DESTINATION TABLE   ● ALL ▶
■ DESTINATION TYPE    ● ALL ▶

◁ 1/1 ▷   REGISTER   DETAILS/EDIT ▶

A-C | D-F | G-I | J-L | M-O | P-R | S-U | V-X | Y-Z | 0-9 | ALL

CANCEL          OK

ID PLEASE PRESS ID KEY AFTER END OF OPERATION.   ≡ SYSTEM STATUS/STOP ▲

DESTINATION TABLE

NUMBER OF DESTINATIONS : 0

■ DESTINATION TABLE ● ALL ▶　　■ DESTINATION TYPE ● ALL ▶

| ✓ | TYPE | NAME | DESTINATION |
|---|---|---|---|
| ☐ | fax | fax address | 012345678 |
| ☐ | email | email address | email@XYZ.jp |
| ☐ | i-fax | i-fax address | i-fax@XYZ.jp |
| ☐ | ftp | ftp address | ftphost |
| ☐ | group | group address | FOUR DESTINATIONS |

◁ 1/1 ▷

REGISTER

[A-C] [D-F] [G-I] [J-L] [M-O] [P-R] [S-U] [V-X] [Y-Z] [0-9] [ALL]

CANCEL　　DETAILS / EDIT　　OK

[ID] PLEASE PRESS ID KEY AFTER END OF OPERATION.　　SYSTEM STATUS / STOP ▲

FIG. 18

F I G. 21
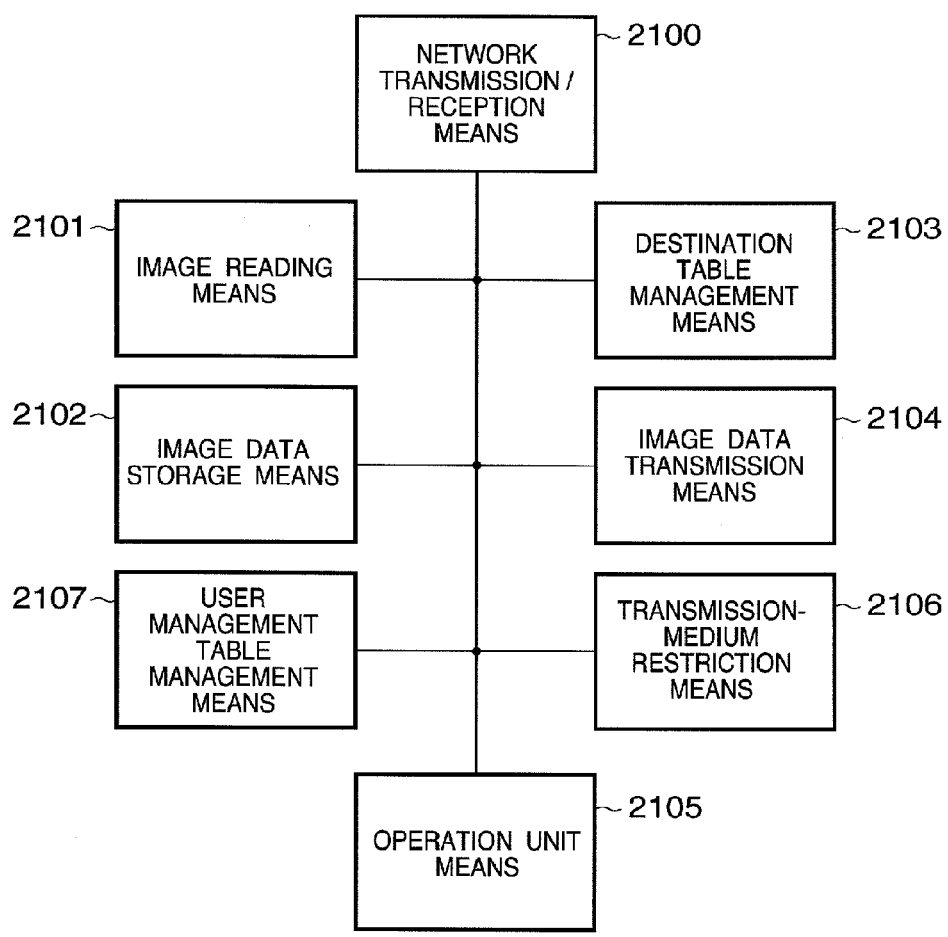

F I G. 23B
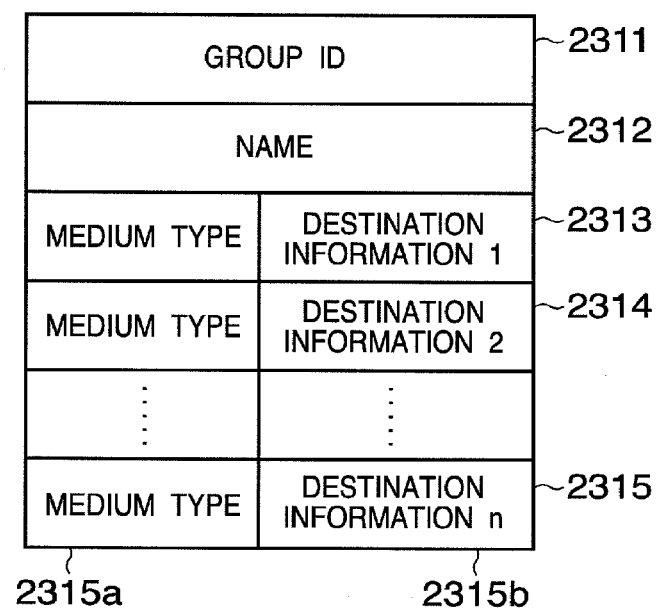

DATA TRANSMISSION APPARATUS, CONTROL METHOD THEREFOR, AND IMAGE INPUT/OUTPUT APPARATUS

CROSS REFERENCE TO RELATED APPLICATION

This application is a continuation of U.S. application Ser. No. 11/535,310 filed on Sep. 26, 2006, the entire disclosure of which is incorporated by reference herein.

BACKGROUND OF THE INVENTION

1. Field of the Invention

The present invention relates to a data transmission apparatus capable of holding, e.g., a destination of transmission and transmitting image information or the like to the destination, a control method therefor, and an image input/output apparatus. Particularly, the present invention relates to a data transmission apparatus which controls display of a destination corresponding to a function available to the user and thereby manages the function available to the user, a control method therefor, and an image input/output apparatus.

2. Description of the Related Art

As the network speed increases, documents and image data are provided more and more via a network. Some digital multifunction devices each having a scanner and printer can print an original on a sheet medium, like a copying machine, and can also transmit, via a network, document data read by a scanner or document data received from a personal computer. Transmission media (transmission protocols) provided by the digital multifunction device include various media such as email, facsimile (FAX), a file transfer protocol (FTP), and a server message block (SMB). Transmission by these methods requires designating a destination of transmission in a format corresponding to each medium. In order to manage a plurality of destinations (destinations of transmission), the digital multifunction device has a transmission address book (destination list). The transmission address book generally saves transmission destination information such as an address in correspondence with the name of the transmission destination. The transmission address book is a list in which addresses each having items such as the name of a destination, the transmission protocol type, and detailed attribute data are registered for one or a plurality of destinations of transmission. The user can select an address from the displayed address book to easily designate the destination. Each address has an attribute (item) "access code". The user can use only an address having an access code which matches an access code input by the user.

A plurality of users share an advanced digital multifunction device. The advanced digital multifunction device can discriminate a user by his password or the like and can set, for example, the upper print count for each user, providing fine user management. User management is based on user management information registered by the administrator or the like.

A plurality of application programs (also simply called an application) are installed in the digital multifunction device. In order to facilitate management and centralize information, a plurality of applications running on the digital multifunction device commonly use the address book and user management information. Japanese Patent Laid-Open No. 2003-333241 discloses a multifunction device which allows a plurality of applications running on the multifunction device to share user information and can centralize and manage the user information.

There are demands to manage a transmission medium provided by a digital multifunction device in more detail for each user. More specifically, it is desired to restrict a transmission medium available to each user. For example, when using a digital multifunction device installed at a university, the administrator wants an operation to restrict ordinary students in facsimile transmission requiring high communication cost and permit facsimile transmission to only limited students. In this case, a conventional digital multifunction device provides only an operation to assign an access code to a facsimile number, register them, and notify a user permitted to perform facsimile transmission of the registered access code. In other words, the administrator must manage permission/inhibition of facsimile transmission by creating a user list or the like.

In this manner, the digital multifunction device does not have a function to restrict a user-specific transmission medium. Some multifunction devices can register, in the address book, a grouped destination for transmitting data of the same contents to a plurality of destinations. The grouped destination can contain the destinations of different media. For example, for a given name, a facsimile number and email address serving as destinations can be registered as one grouped destination. When a grouped destination contains a destination of a medium type to which the user is inhibited from transmitting data, a message to this effect must be displayed to the user in an easy-to-understand form; otherwise, the user believes that he successfully transmitted data, though transmission fails.

SUMMARY OF THE INVENTION

The present invention has been made in consideration of the above situation, and has as its object to provide a data transmission apparatus capable of managing a transmission medium available to each user, a control method therefor, and an image input/output apparatus. It is another object of the present invention to provide a data transmission apparatus which notifies a user who attempts to use a transmission medium for which the user does not have use authority, that he does not have authority, a control method therefor, and an image input/output apparatus.

The present invention is made to achieve the above objects. That is, a data transmission apparatus capable of transmitting data by using a plurality of transmission media comprises an authority storage unit, adapted to store authority information representing use authority to use each transmission medium by each user, and a transmission control unit, adapted to, in transmitting data, restrict data transmission to a destination corresponding to a transmission medium for which a current user does not have the use authority.

According to the present invention, an available transmission medium can be managed for each user, and the management can target each destination. A user who attempts to use a transmission medium for which the user does not have use authority is notified that he does not have authority, and thereby notified that he cannot use the transmission medium. The user can transmit data to grouped destinations of multi-address transmission using a given transmission medium without being aware that an unavailable destination is contained in the grouped destination or a function unavailable to the user is registered.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a view showing an example of a destination access number input window;

FIG. 10 is a view showing an example of a destination list window;

FIG. 12 is a view showing an example of a password registration window;

FIG. 13 is a view showing an example of a dialog window for registering an ID and password;

FIG. 15 is a view showing an example of a registered-transmission destination list window;

FIG. 16 is a view showing another example of the registered-transmission destination list window;

FIG. 17 is a view showing still another example of the registered-transmission destination list window;

FIG. 18 is a view showing still another example of the registered-transmission destination list window;

FIG. 21 is a functional block diagram of processes associated with user-specific transmission-media restriction and a transmission destination display method;

FIGS. 23A and 23B are views each showing an example of the structure of a record in an address book table;

DESCRIPTION OF THE EMBODIMENTS

<Arrangement of Digital Copying Apparatus>

Figure 1:
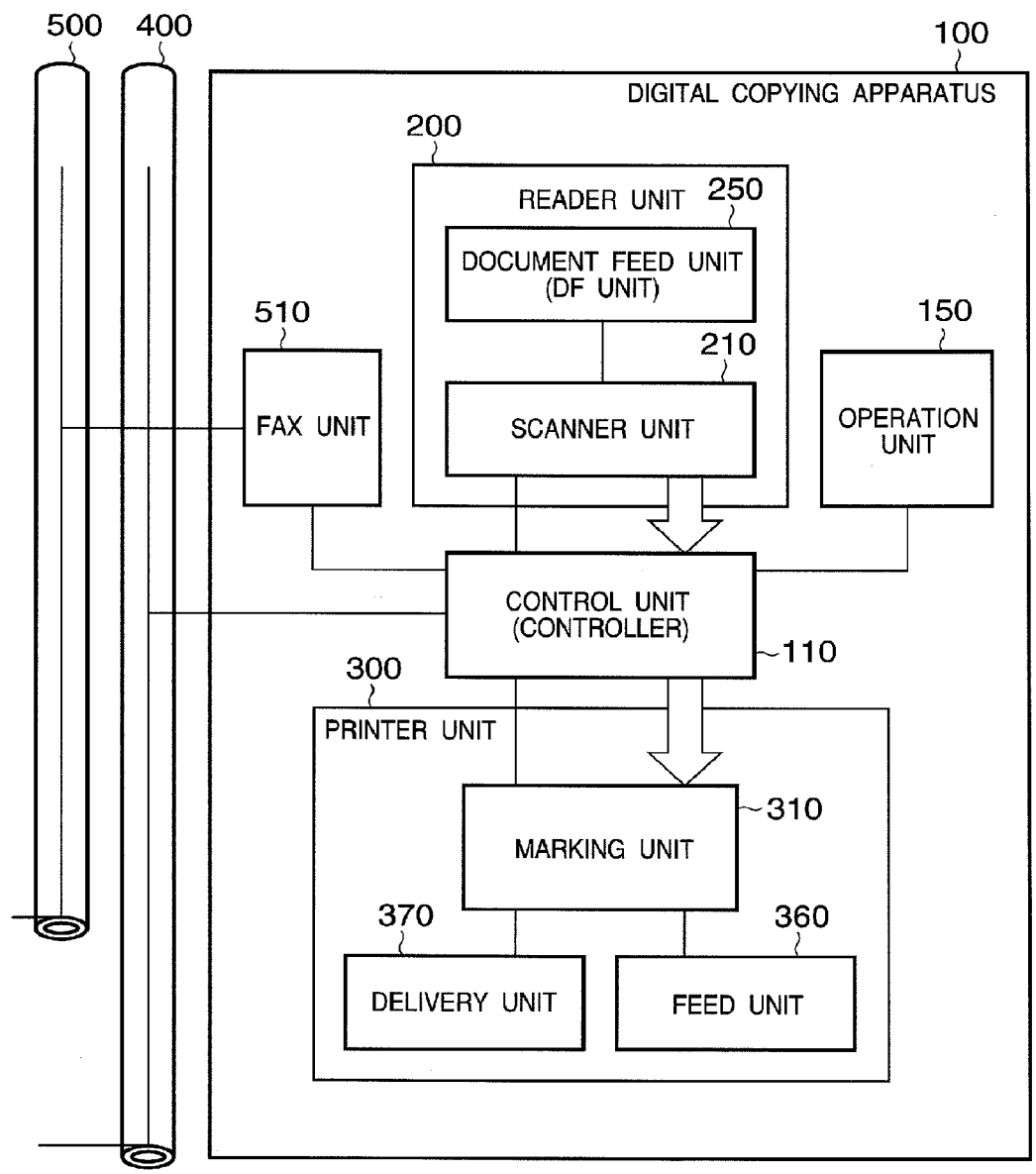
FIG. 1 is a functional block diagram of an image processing apparatus according to the present invention.

FIG. 1 is a functional block diagram of a digital copying apparatus which implements an image input/output apparatus according to the present invention. More specifically, FIG. 1 is a block diagram of a network-compatible digital multifunction device having a scanner and printer. A digital copying apparatus 100 provides various basic image input/output functions and image processing functions such as a printer, image input, document filing, document transmission/reception, and image conversion.

A reader unit (image input apparatus) 200 optically reads an original image, and converts it into image data. The reader unit 200 comprises a scanner unit 210 having a function of scanning an original, and a document feed unit 250 having a function of conveying an original sheet.

A printer unit (image output apparatus) 300 conveys a print sheet, forms image data as a visible image on the print sheet, and delivers the print sheet outside the apparatus. The printer unit 300 comprises a feed unit 360 having a plurality of types of print sheet cassettes, a marking unit 310 having a function of transferring and fixing image data onto a print sheet, and a delivery unit 370. The delivery unit 370 has a function of sorting printed sheets, stapling them, and outputting them outside the apparatus.

A control unit 110 electrically connects to the reader unit 200 and printer unit 300, and connects to a LAN 400. The control unit 110 also connects to a public line 500 via a FAX unit 510. The control unit 110 provides a copy function of controlling the reader unit 200 to read image data of an original, and controlling the printer unit 300 to output the image data on a print sheet. The control unit 110 also provides a scanner function and printer function. The scanner function is to convert image data read by the reader unit 200 into code data and transmit the code data to a host computer (not shown) via the LAN 400. The printer function is to convert code data received from the host computer via the LAN 400 and output the image data to the printer unit 300.

An operation unit 150 connects to the control unit 110. The operation unit 150 is formed from a liquid crystal touch panel, and provides a user I/F to operate the image input/output system. The operation unit 150 displays UI windows in FIGS. 4 to 18 to be described later.

<Arrangement of Control Unit 110>

Figure 2:
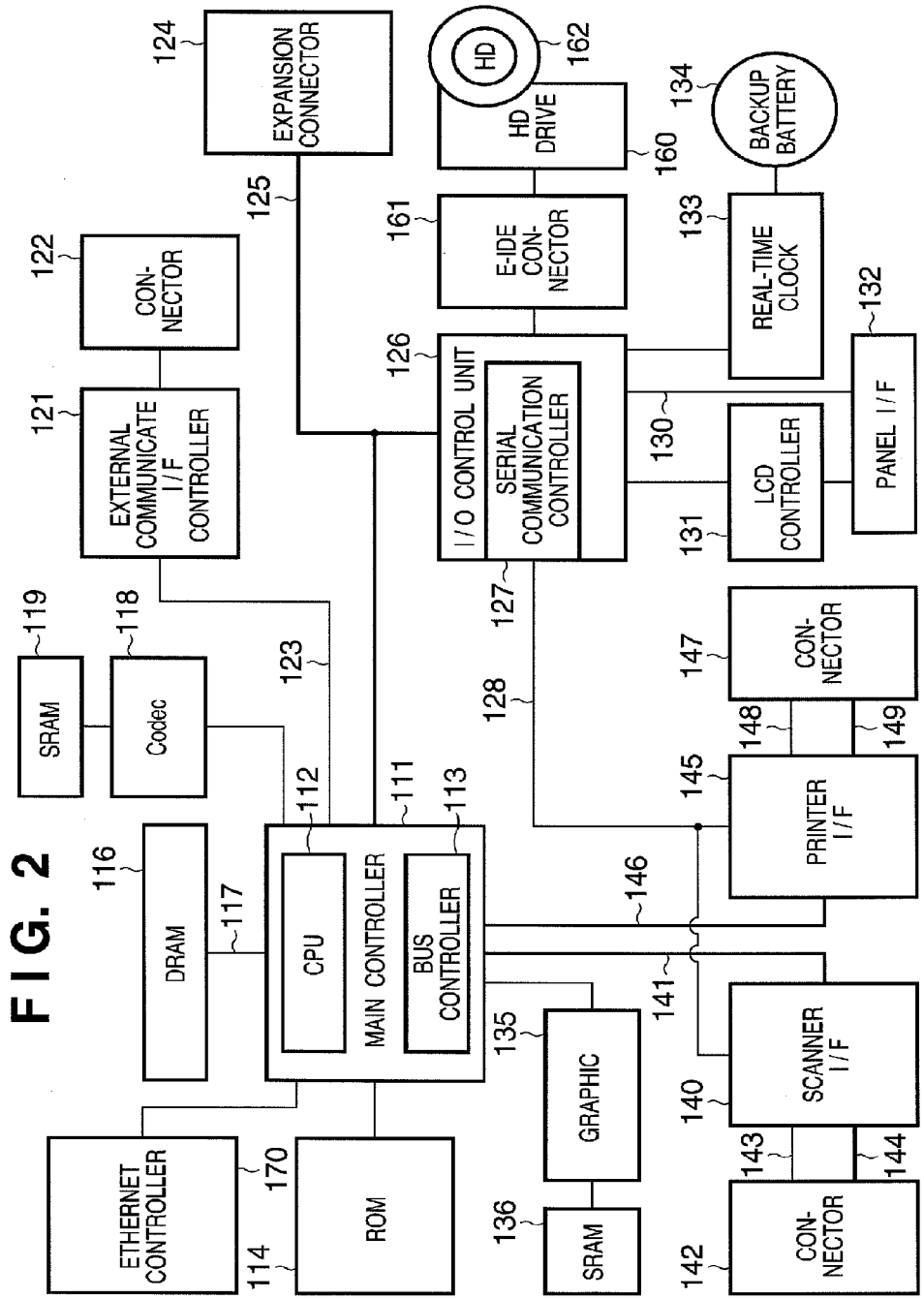
FIG. 2 is a block diagram of the hardware arrangement of the image processing apparatus.

FIG. 2 is a block diagram showing the hardware arrangement of the control unit 110 of the digital copying apparatus 100.

A main controller 111 mainly comprises a CPU 112, bus controller 113, and various I/F controller circuits. The CPU 112 and bus controller 113 control the whole operation of the control unit 110. The CPU 112 runs on the basis of a program loaded from a ROM 114 via a ROM interface (to be abbreviated as an I/F) 115. This program also describes an operation to interpret code data of a page description language (to be abbreviated as a PDL) 115 received from a host computer and expand the data into raster image data. Software processes this program. The bus controller 113 controls transfer of data input/output from/to each I/F, and performs arbitration upon bus contention and control of DMA data transfer.

A DRAM 116 connects to the main controller 111 via a DRAM I/F 117, and is used as a work area for operating the CPU 112 and a storage area for accumulating image data. An Ethernet® controller 170 is a network controller for connecting to the LAN, and allows the main controller to access a network. Data is transmitted/received via the LAN by email using SMTP (Simple Mail Transfer Protocol), Internet facsimile (i-FAX), FTP (File Transfer Protocol), and SMB (Server Message Block). A Codec 118 compresses raster image data accumulated in the DRAM 116 by a format such as MH/MR/MMR/JBIG/JPEG, and decompresses compressed/accumulated code data into raster image data. An SRAM 119 serves as a temporary work area for the Codec 118. The Codec 118 connects to the main controller 111 via an I/F 120, and the bus controller 113 controls data transfer between the Codec 118 and the DRAM 116 to DMA-transfer the data. A graphic processor 135 performs processes such as image rotation, scaling, and color space conversion.

An external communicate I/F 121 connects to the main controller 111 via an I/F 123, and connects to an external network via a connector 122. The connected external network is a public telephone network such as ISDN. The external network mediates facsimile transmission/reception.

A general high-speed bus 125 connects an I/O control unit 126 and an expansion connector 124 for connecting an expansion board. The general high-speed bus is generally a PCI bus. The I/O control unit 126 comprises asynchronous serial communication controllers 127 of two channels that transmit/receive control commands to/from the CPUs of the reader unit 200 and printer unit 300. The I/O control unit 126 connects to external I/F circuit 140 and 145 via an I/O bus 128.

A panel I/F 132 connects to an LCD controller 131, and comprises an I/F for display on the liquid crystal screen of the operation unit 150 and a key input I/F 130 for inputs from hard keys and touch panel keys. The operation unit 150 comprises a liquid crystal display, a touch panel input device adhered onto the liquid crystal display, and a plurality of hard keys. The CPU 112 receives, via the panel I/F 132, a signal input from the touch panel or hard keys. The liquid crystal display unit displays image data sent from a panel I/F 132. The liquid crystal display unit displays functions, image data, and the like in the operation of the image processing apparatus.

A real-time clock module 133 updates and saves a date and time managed in the apparatus, and is backed up by a backup battery 134. An E-IDE connector 161 connects an external storage device. In the embodiment, the I/F connects a hard disk drive 160 to store image data in a hard disk 162 and read out image data from the hard disk 162. The hard disk 162 also saves management information such as an address book (address management table) and user management table.

Connectors 142 and 147 connect to the reader unit 200 and printer unit 300, respectively, and comprise asynchronous serial I/Fs (143 and 148) and video I/Fs (144 and 149). The scanner I/F 140 connects to the reader unit 200 via the connector 142 and to the main controller 111 via a scanner bus 141. The scanner I/F 140 has a function of performing a predetermined process for an image received from the reader unit 200. The scanner I/F 140 also has a function of outputting to the scanner bus 141a control signal generated on the basis of a video control signal sent from the reader unit 200. The bus controller 113 controls data transfer from the scanner bus 141 to the DRAM 116.

The printer I/F 145 connects to the printer unit 300 via the connector 147 and to the main controller 111 via a printer bus 146. The printer I/F 145 has a function of performing a predetermined process for image data output from the main controller 111 and outputting the processed data to the printer unit 300. The printer I/F 145 has also a function of outputting to the printer bus 146 a control signal generated on the basis of a video control signal sent from the printer unit 300.

The bus controller 113 controls transfer of raster image data expanded in the DRAM 116 to the printer unit, and DMA-transfers the raster image data to the printer unit 300 via the printer bus 146 and video I/F 149.

With the above arrangement, the digital copying apparatus 100 can transmit image data to desired destinations using various media such as email, facsimile, Internet facsimile, and file transfer.

<Structure of Software Module of Controller>

Figure 3:
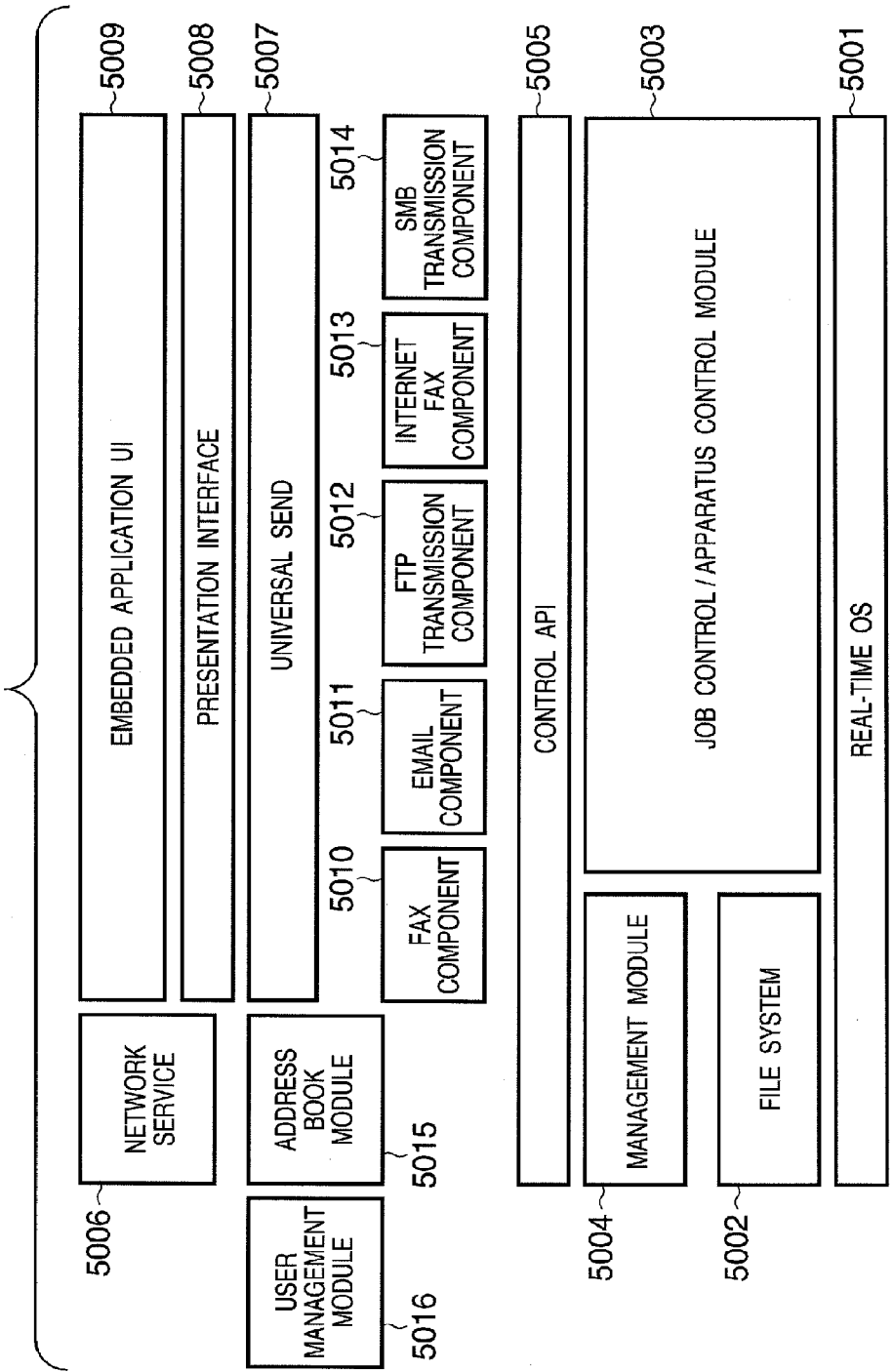
FIG. 3 is a block diagram showing the software module structure of the controller of the image processing apparatus.

FIG. 3 is a block diagram showing a software module structure implemented by the controller 110 of the digital copying apparatus 100. In FIG. 3, modules associated with transmission of image data will be mainly explained. Software processed by the controller 110 incorporated in the digital copying apparatus 100 is installed as so-called firmware, and executed by the CPU 112 of the apparatus.

A real-time operating system (OS) 5001 provides software running on the OS with various resource management services and frameworks optimized to control an embedded system. Various resource management services provided by the real-time OS 5001 include multi-task management (thread management), inter-task communication, memory management, interrupt management, various device drivers, and protocol stacks. Multi-task management (thread management) is a function of substantially parallel-operating a plurality of processes by managing a plurality of execution contexts of processes by the CPU. Inter-task communication is a function of implementing synchronization and data exchange between tasks. The protocol stacks are software modules which contain processes of various protocols for a local interface, network, and communication.

A file system 5002 is a mechanism to store data created in a storage device such as a hard disk or memory. The file system 5002 is used to spool jobs treated by the controller 110 of the image processing apparatus or save various data. A job control/apparatus control module 5003 controls hardware of the image processing apparatus, and controls jobs using basic functions (e.g., print, scan, communication, and image conversion) provided mainly by hardware of the image processing apparatus. A management module 5004 manages the operation of the controller so as to control an internal state associated with the operation of the controller 110 of the image processing apparatus. A control API 5005 is an application programming interface which allows embedded applications as an upper layer of the control API 5005 to use services provided by software modules as a lower layer of the control API 5005.

A network service 5006 mutually converts the control API 5005 and a network protocol, allowing an external network node such as a client PC to utilize the basic functions of the apparatus. The network service 5006 has a network server function having various protocols (e.g., LPR, NetWare, SMB, PAP, and IPP) for network printing, and makes it possible to input a print job from an external network node such as a client PC.

A presentation interface 5008 and embedded application UI 5009 form an embedded application. The embedded application uses the basic functions of the control API to implement host functions such as copying, image scanning, document transmission/reception, and document filing in addition to the basic functions of the image processing apparatus. A universal send 5007 corresponds to business logic of the embedded application. The presentation interface 5008 divides the embedded application into business logic and presentation logic. The embedded application UI 5009 corresponds to presentation logic of the embedded application, and controls display and input of a graphical user interface (GUI) in order to allow the user to operate the embedded application. The embedded application UI 5009 provides a local user interface on the operation unit 150 of the image processing apparatus, and also provides a Web application implemented using a markup language (e.g., HTML) and a Web technique (e.g., HTTP). The user can access the Web application from a Web browser running on a client PC or the like and remote-control the image processing apparatus. The presentation layer of the embedded application installed as the Web application will be called a remote UI.

The universal send 5007 plays a primary role of an image transmission application, and transmits image data accumulated in the image processing apparatus to a terminal (not shown) in accordance with contents designated by the user via the embedded application UI 5009. The universal send 5007 can transmit one image by various transmission protocols (transmission media). A FAX component 5010 can FAX-transmit an image through a public line, whereas an email component 5011 can transmit an image as an attached file of email. An FTP transmission component 5012 transmits an image as a file by the FTP protocol. An Internet FAX component 5013 transmits an image by the Internet FAX protocol. An SMB transmission component 5014 can transmit an image as a file or print data by the SMB protocol.

An address book management module 5015 can save, read, and maintain a destination of transmission. The address book management module 5015 provides the user with a function of easily operating and managing a destination of transmission used in the universal send 5007. A user management module 5016 maintains and manages a user management table which holds the authority of a user who uses the digital multifunction device 100.

<Functional Blocks Associated with Transmission-Media Restriction>

FIG. 21 is a functional block diagram of processes associated with user-specific transmission-media restriction (also called transmission-function restriction) and a transmission destination display method in the present invention. A network transmission/reception means 2100 corresponds to the Ethernet® controller 170 and network software. The network transmission/reception means 2100 corresponds to a process to transmit an image held in the image input/output apparatus to a network or receive image data from a processing terminal such as a personal computer. An image reading means 2101 corresponds to a scanner, and converts an original image or document into digital data. An image data storage means 2102 saves image data generated by the image reading means 2101 or image data received by the network transmission/reception means 2100. Image data is saved as a file in a nonvolatile storage such as a hard disk.

A destination table management means 2103 corresponds to a transmission address book, and can register, edit, delete, and browse a transmission address. A registered address book is saved as a file in the internal storage of the apparatus, similar to image data. A user management table management means 2107 saves and maintains a user management table which holds the password of each user, authority for each transmission medium, and the like. An image data transmission means 2104 corresponds to universal send software of an application in the apparatus. The image data transmission means 2104 generates and acquires image data to be transmitted by using the image reading means 2101 and image data storage means 2102. The image data transmission means 2104 uses the destination table management means 2103 to create a transmission destination list, and uses the network transmission/reception means 2100 to transmit created or acquired image data to a destination contained in the transmission destination list. A transmission-media restriction means 2106 manages registered users, and manages correspondence between the registered users and transmission media available to them. For example, when the image data transmission means 2104 creates a transmission destination list or transmits image data, the transmission-media restriction means 2106 looks up the user management table to determine whether the user has use authority to use each transmission medium corresponding to a destination. If the user does not have the use authority, the transmission-media restriction means 2106 excludes the destination from the transmission destination list, or does not transmit any data to the destination. At the same time, the transmission-media restriction means 2106 provides, e.g., a display to notify the user of a message to this effect.

These operations are done through an operation unit means 2105. The operation unit means 2105 comprises an information display LCD panel, and a touch panel and keyboard through which the apparatus recognizes an instruction from the user. Examples of the transmission media are email, FAX, and transmission protocols such as SMB.

Note that the functional blocks in FIG. 21 explain not the essence of the present invention, but an apparatus or method which is built as the core of the present invention. Hence, arranging the building elements shown in 21 is a sufficient condition to implement the present invention but is not a necessary condition. For example, the present invention is implemented without the image reading means 2101.

<Example of Operation Window>

Figure 4:
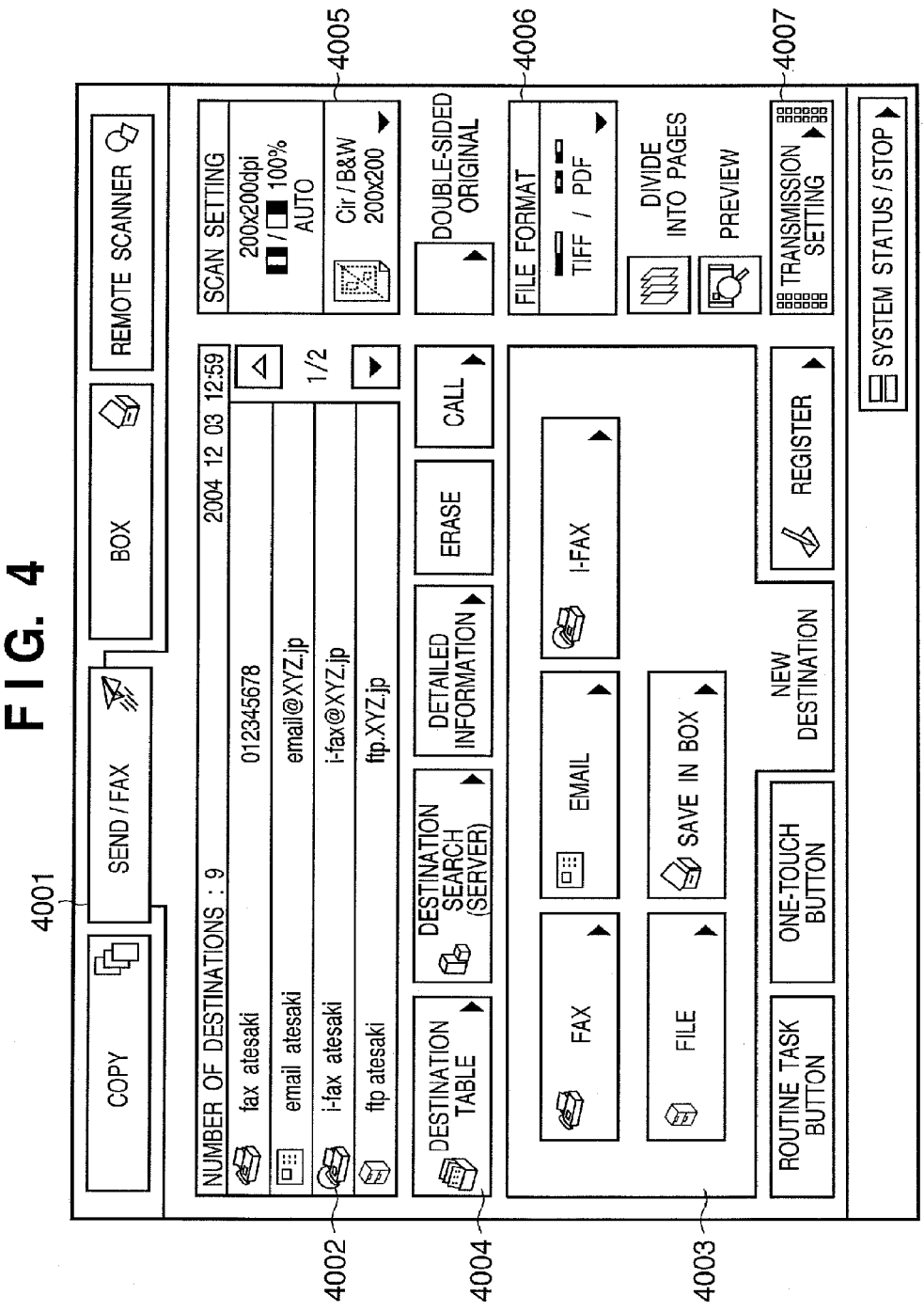
FIG. 4 is a view showing an example of the operation window of an embedded application.

FIG. 4 shows a concrete operation window of the embedded application UT 5009. The digital multifunction device 100 has various functions such as copy, scanner, and transmission. A function for use can be selected by switching the operation window with a function switching button 4001. FIG. 4 shows an example of a window which displays the SEND/FAX function. A destination list 4002 displays a list of transmission destinations designated by the user with a destination table button 4004 or a button on a new destination tab 4003. Note that the destination table is an address book. An image to be transmitted is scanned by a scanner. In scanning, the user can open a designation window (not shown) with the scan setting button to select a color or monochrome mode and designate a scan resolution. In FIG. 4, it is set to automatically determine the color/monochrome mode and scan an image at a resolution of 200×200 dpi. A file format selection button 4006 designates a file format used in image transmission. As the file format, the user can designate TIFF and PDF. In FIG. 4, it is set to transmit monochrome images by TIFF and color images by PDF. The user uses a transmission setting button 4007 to open a transmission setting window (not shown) for designation associated with transmission. With the transmission setting button 4007, the user can designate transmission at designated time, a subject of email, and the like.

<Maintenance of Address Book>

Figure 5:
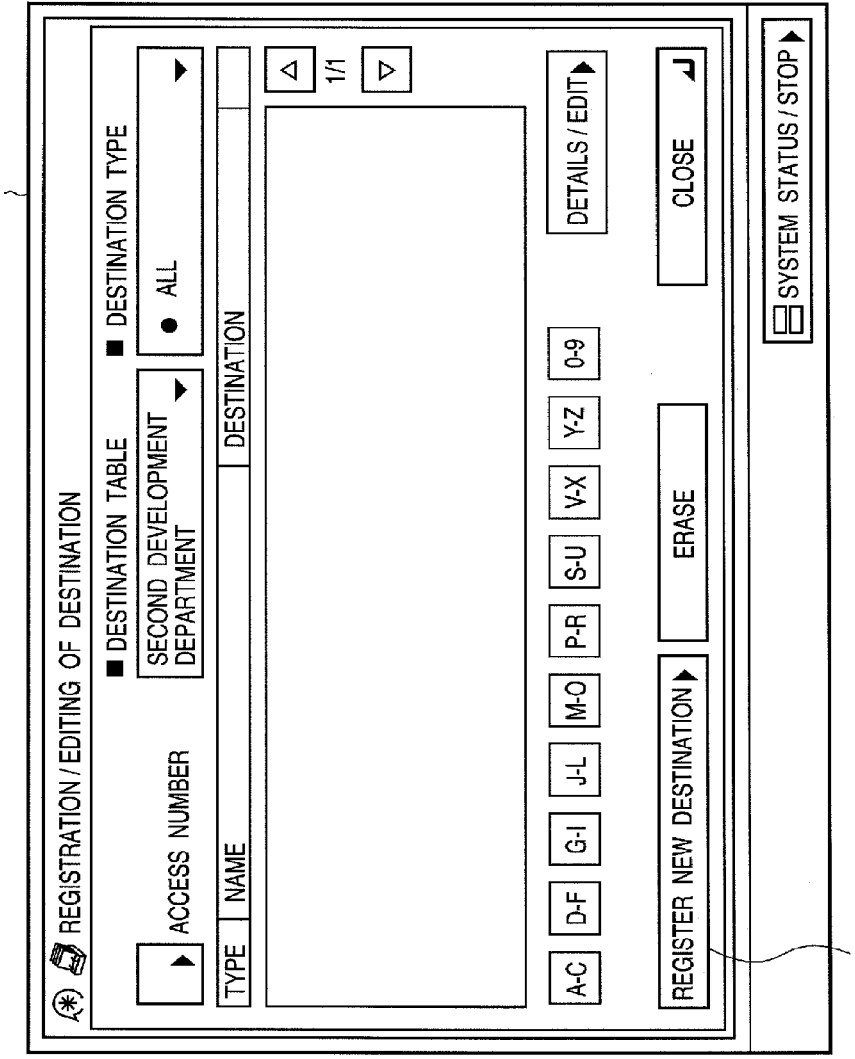
FIG. 5 is a view showing an example of an address registration window.

Registration and editing of a transmission address in the address book will be explained. FIG. 5 shows an address registration window. When the user presses the destination table button 4004 or new destination tab 4003 in FIG. 4, an address registration window 502 in FIG. 5 is displayed. The user uses the destination table button 4004 to select a sub-address book obtained by dividing the entire address book. When the user presses the destination table button 4004, the destination list 4002 exhibits destinations belonging to the selected sub-address book. A new destination registration button 501 is arranged at the bottom of the address registration window 502 in FIG. 5. The user presses the new destination registration button 501 to display a destination registration/editing window in FIG. 6.

Figure 6:
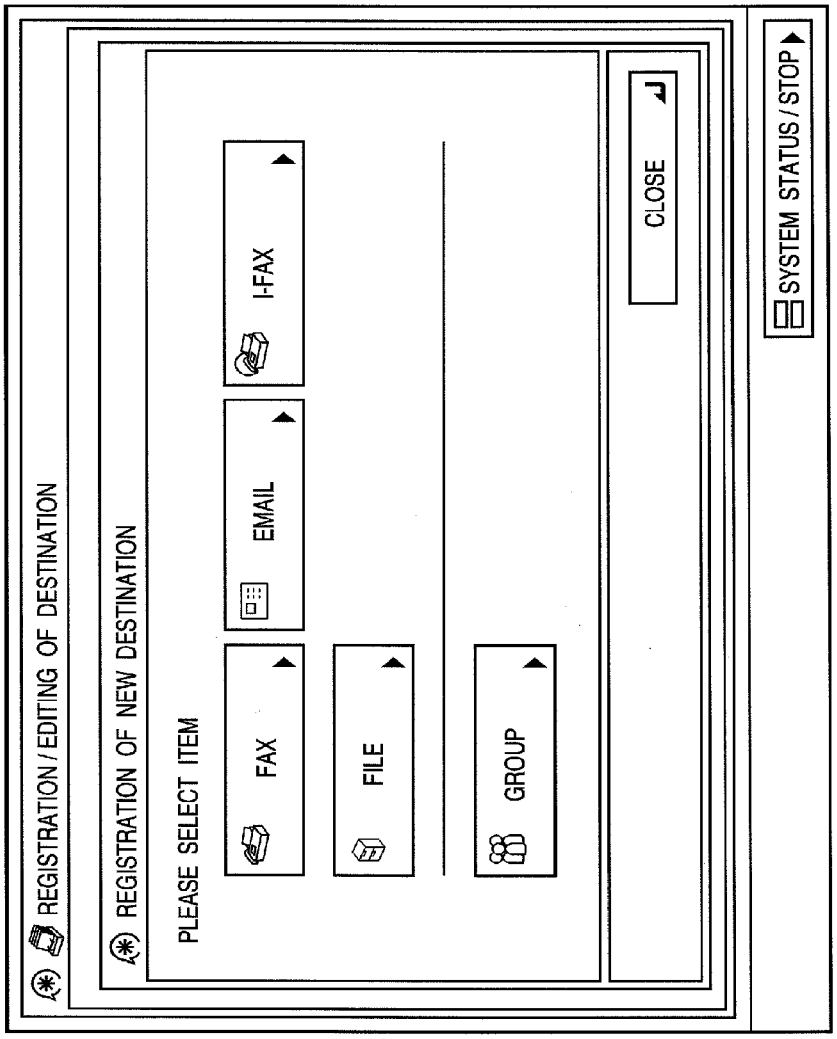
FIG. 6 is a view showing an example of a new destination registration window.

FIG. 6 shows a new destination registration window. The digital copying apparatus supports FAX, email, Internet FAX, and file transmission by SMB, FTP, and the like as selectable transmission media. The operator can select an arbitrary protocol to register a destination in the address book. The operator can also register a plurality of destinations as a grouped destination. Media may correspond to different destinations. For respective media (displayed as "items" in FIG. 6), the registration window prepares buttons for selecting media. Among the prepared buttons, the user presses (e.g., clicks) the button of a medium whose destination is to be registered, thereby selecting the medium.

Figure 7:
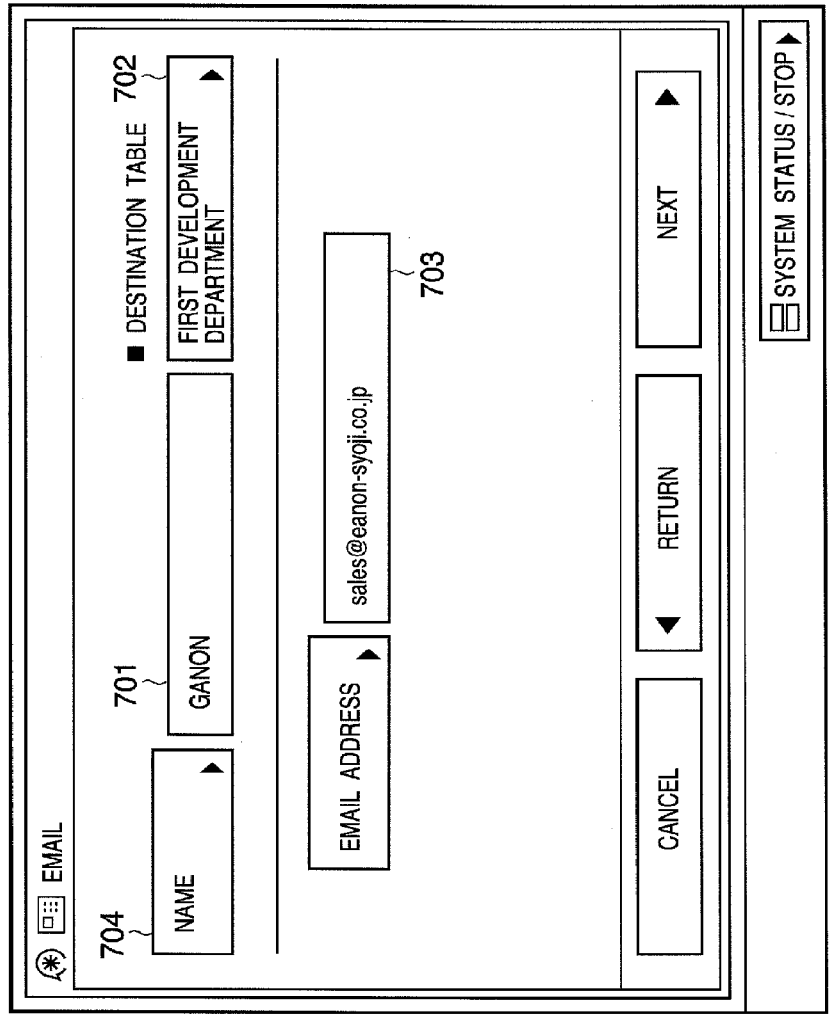
FIG. 7 is a view showing an example of a registration window when the user selects email.

FIG. 7 shows a registration window when the user selects email as an example of the registration window. The registration window has a field 701 of a name to be displayed in the address book as an attribute given to all addresses. The name field 701 allows inputting arbitrary characters through the software keyboard. The destination name is not limited to email, and is also registered for facsimile, FTP, Internet facsimile, and the like.

The user can select a sub-address book with a destination table button 702 at the upper right of the window. By selecting a desired sub-address book with the destination table button 702, the user can classify and register a destination (email address in FIG. 7) into the selected sub-address book. In FIG. 7, the user selects a sub-address book "first development department" in FIG. 7.

An email address field 703 is arranged at the center of the window. The user inputs an email address with the software keyboard. After the end of inputs, the user presses the "Next" button to display an access number input window in FIG. 8. The access number is identical to an access code.

FIG. 8 shows a destination access number input window. When the user sets an access number, the destination list 4002 in FIG. 4 exhibits only a destination (mail address for email) for which an access number matching an access number separately input by the user is registered. The destination list does not exhibit a destination for which an access number not matching an access number input by the user is registered. This prevents a problem that any user can see registered addresses in displaying a destination list registered in the address book. For an address which can be shown to any user, its access number is left blank. An address whose access number field is blank is displayed without collating an access number. After the end of inputs, the user presses the OK key to save the address in the internal memory of the apparatus.

Figure 9:
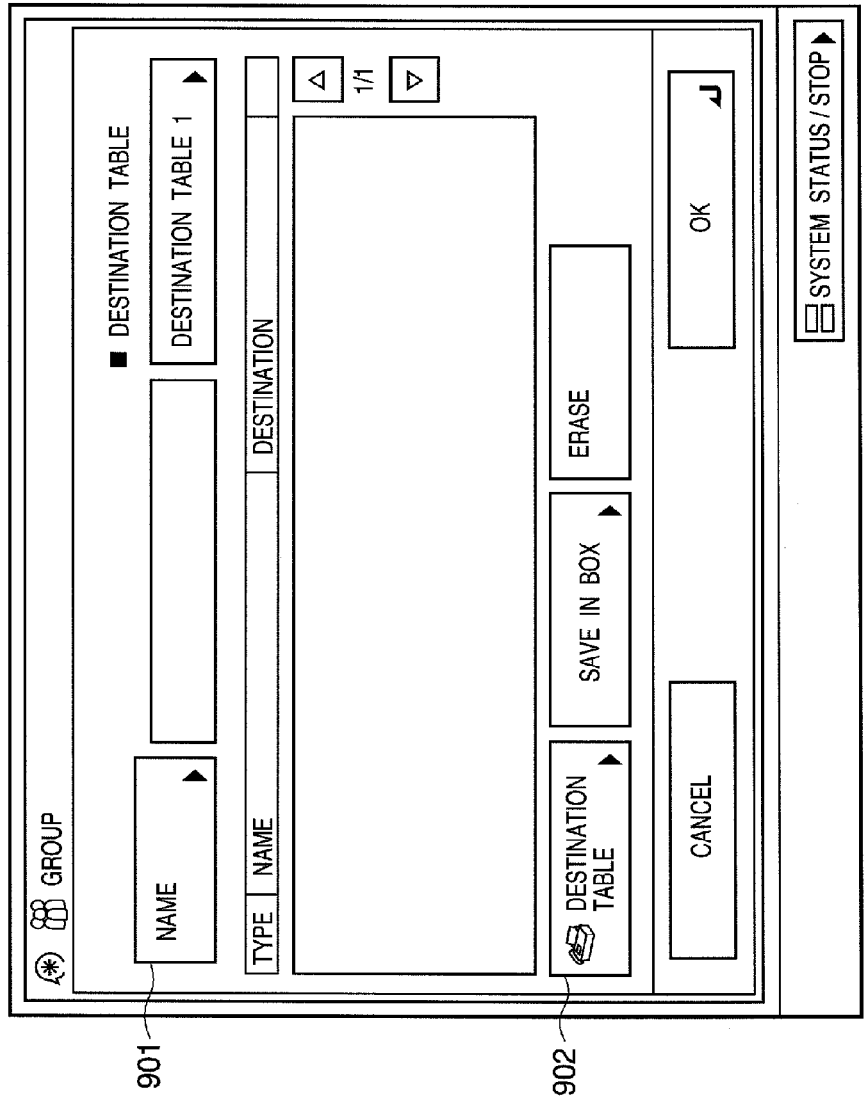
FIG. 9 is a view showing an example of a grouped destination registration window.

FIG. 9 shows a grouped destination registration window. When the user presses a "group" button in the window of FIG. 6, the window shifts to one in FIG. 9. A grouped destination is used to handle a plurality of transmission destinations as one destination, and allows designating a plurality of destinations by a simple operation. The user designates the name of a grouped destination with a name button 901, and selects a destination of transmission to be contained in the grouped destination with a destination table button 902. The user presses the destination table button 902 to display a list of destinations registered in the address book, as shown in FIG. 10. The user checks a destination in the list and thereby can set the destination of transmission in the group of the designated name.

The above example is related to email and the grouped destination. Internet facsimile and FTP can be registered by the same procedures as those of email. The UI window changes from "email" to "Internet facsimile" or "FTP" and displays "Internet facsimile" or "FTP". An input destination is saved by transmission medium. An input address is an Internet facsimile address or FTP address. An inputtable destination is a facsimile number, which also applies to facsimile.

<Example of Structure of Address Book and Maintenance Procedures>

Figure 23A:
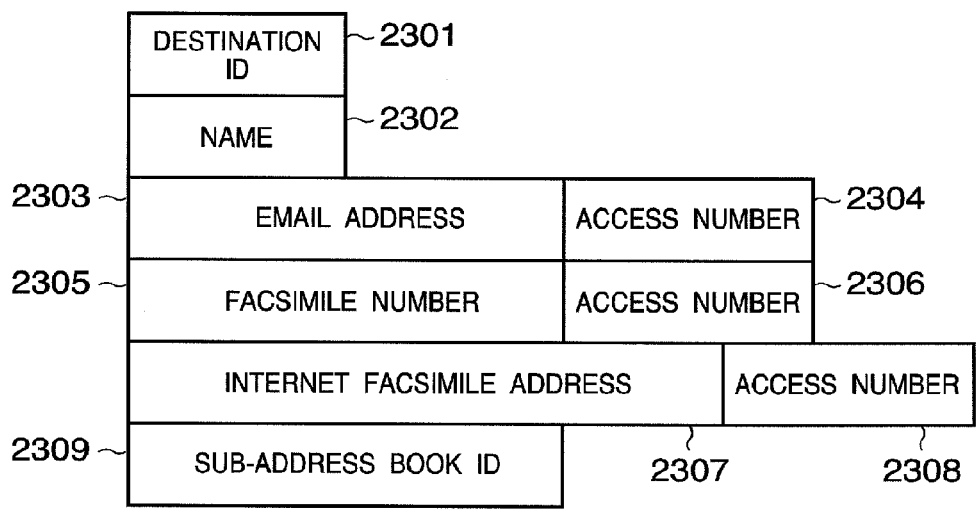

FIGS. 23A and 23B show an example of the structure of the address book. FIG. 23A shows an example of a normal destination record, and FIG. 23B shows an example of a group address destination record. When one address book contains records of these types, an ID representing the type of record is further added to each record. The normal destination record contains a destination ID 2301, name 2302, email address 2303, corresponding access number 2304, facsimile number 2305, corresponding access number 2306, Internet facsimile address 2307, access number 2308, and sub-address book ID 2309. Input values at respective items are stored in the fields of FIG. 23A. In the example of FIG. 23A, an email address, facsimile number, and Internet facsimile number are registered in association with one name, but a name may be associated with each destination information. An access number is associated with each destination information, but one access number may be associated with one destination ID. The destination list displays destinations such as an email address, facsimile number, and Internet facsimile number in accordance with the name. When an access number is registered, the destination list exhibits only an access number input by the user. When a sub-address book name is registered, the sub-address book name (or corresponding unique ID) is registered in the sub-address book ID field 2309.

FIG. 23B shows a group address destination record. For one record of this type, one group ID 2311 and one group name 2312 are registered. The group contains a destination as a pair of a medium type 2315$a$ and destination information 2315$b$. The medium type 2315$b$ is identification information representing a medium such as email, facsimile, or Internet facsimile. The destination information is an address corresponding to the medium type, such as an email address, facsimile number, or Internet facsimile number. When the user selects a grouped destination, pieces of destination information contained in the record of the selected grouped destination are read out and displayed in the display list.

Figure 22:
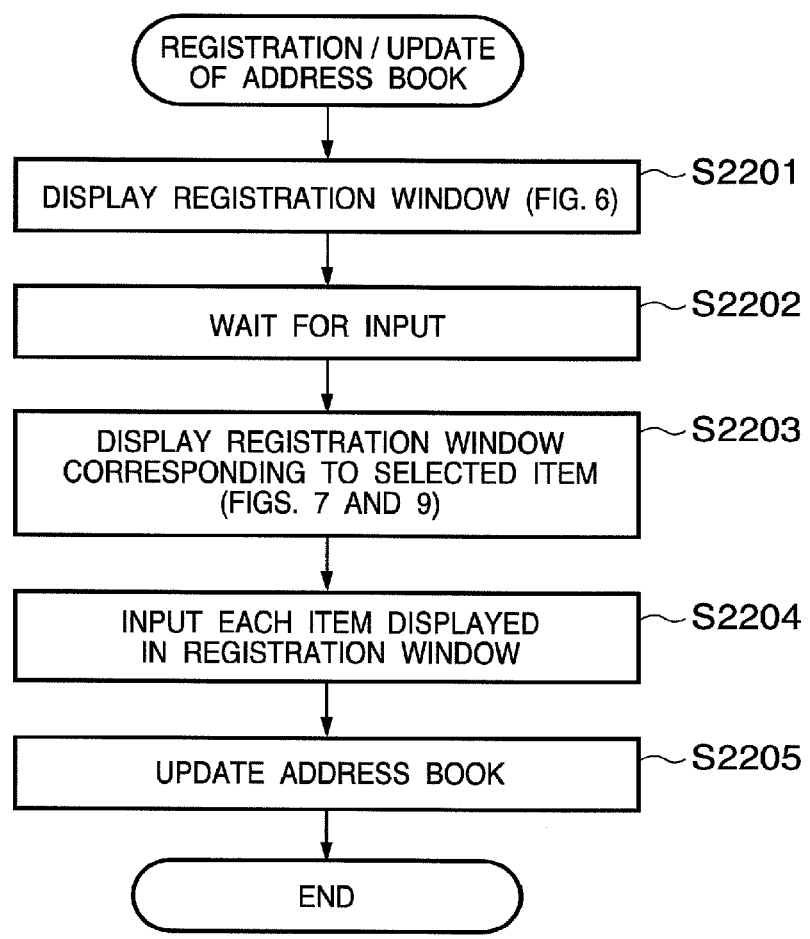
FIG. 22 is a flowchart of address book registration/update procedures.

FIG. 22 is a flowchart showing procedures to register and update the address book. The control unit 110 executes these procedures.

FIG. 22 shows procedures common to medium types. When the user registers a new destination in the address book or changes the contents of the address book, the control unit 110 displays the window in FIG. 6 (step S2201). The process watts for an input from the user (step S2202), and the control unit 110 displays a registration window corresponding to an item selected by the input (step S2203). FIGS. 7 and 9 show examples of this window. The process also waits for an input from the user in this window (step S2204). If the user finally presses the OK button, the control unit 110 writes the input contents in the records shown in FIGS. 23A and 23B, updating the address book file. Each field is blank in new registration, as shown in FIGS. 7 and 9, but displays the contents of an existing record in update.

<User Management>

Figure 11:
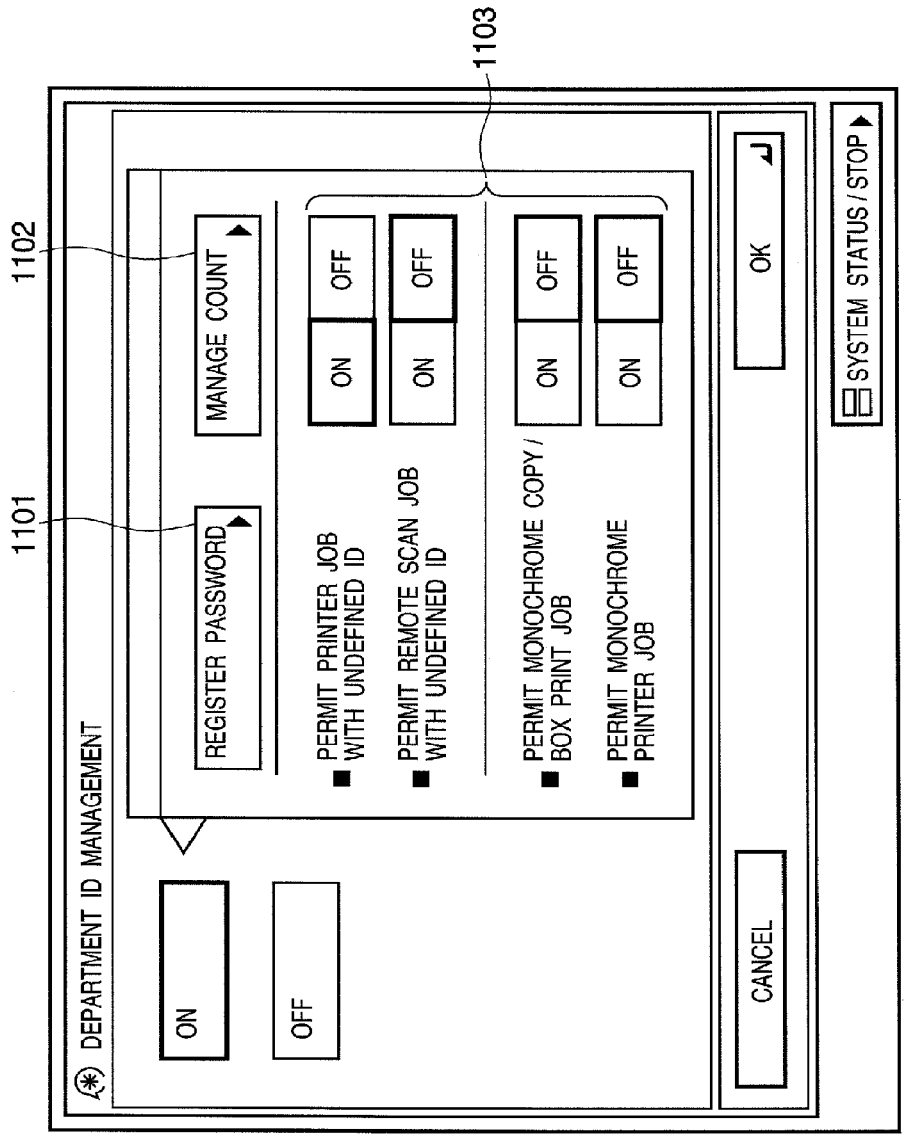
FIG. 11 is a view showing an example of a user registration window.

User registration in the digital multifunction device will be explained. FIG. 11 shows a user registration window. According to the custom of a copying apparatus, user management will be called department ID management, and "department" means a user in this example. That is, the function means user-specific management. Instead of managing respective users, users may be managed by a specific department. In this case, users belonging to the department use a common ID. In any case, available functions and the like are restricted by an ID input when using the multifunction device. The user can press a password registration button 1101 to register a user ID and password, and can press a count management button 1102 to manage a count such as an upper print count. A switch 1103 designates permission/inhibition of various jobs, a description of which will be omitted.

In FIG. 11, the user (in this case, the user is an administrator) presses the password registration button 1101 to display a password registration window in FIG. 12. The administrator can confirm a list of users from the password registration window. A user field 1201 displays the ID and password of each user. At the same time, the administrator can refer to a count value assigned to each user. The administrator presses a registration button 1202 at the bottom of the window to open a dialog for registering a user ID and password, as shown in FIG. 13. The administrator inputs an ID value and password value through the numerical keys of the operation panel (not shown).

Figure 14:
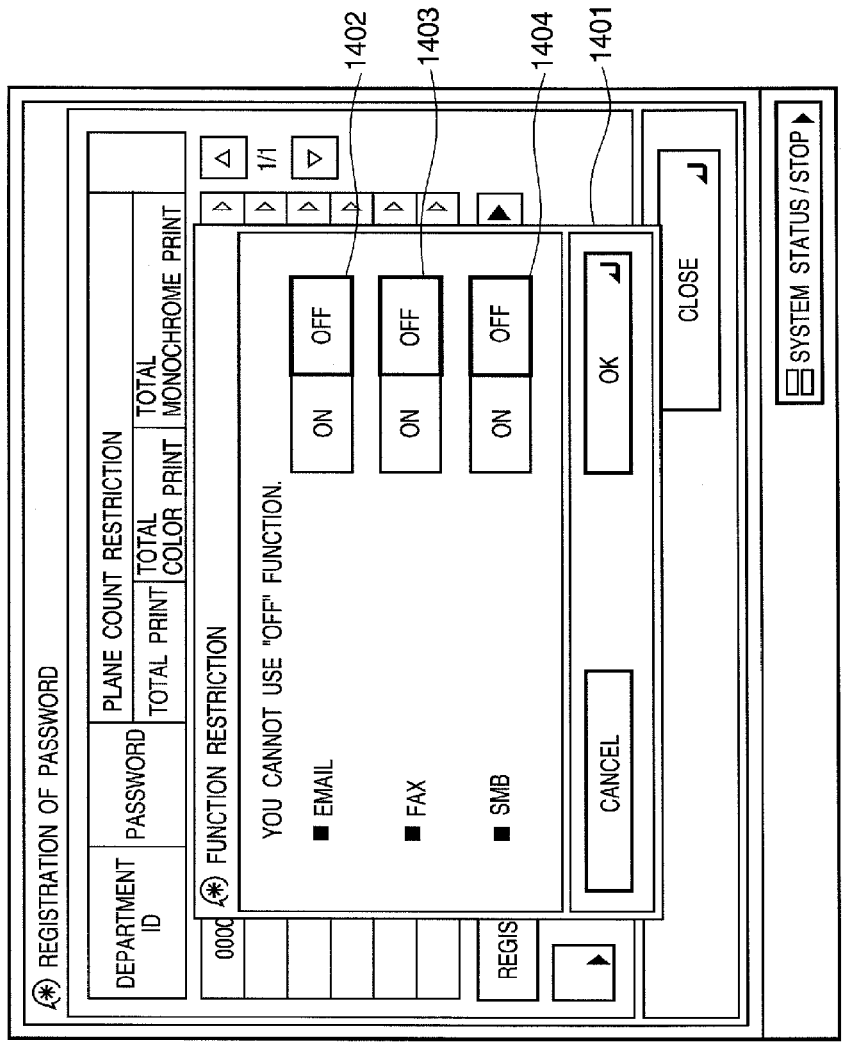
FIG. 14 is a view showing an example of a function restriction dialog window.

While selecting the user field 1201, the administrator presses a function restriction button 1203 in FIG. 12 to display a function restriction dialog 1401 in FIG. 14. In the function restriction dialog 1401, the administrator designates a function of the digital multifunction device that can be used by a selected user. In the example of FIG. 14, the administrator can designate whether to permit (ON) or inhibit (OFF) email, facsimile, and SMB. In FIG. 14, none of the functions can be used, and the selected user cannot use these functions in transmitting an image.

Figure 24:
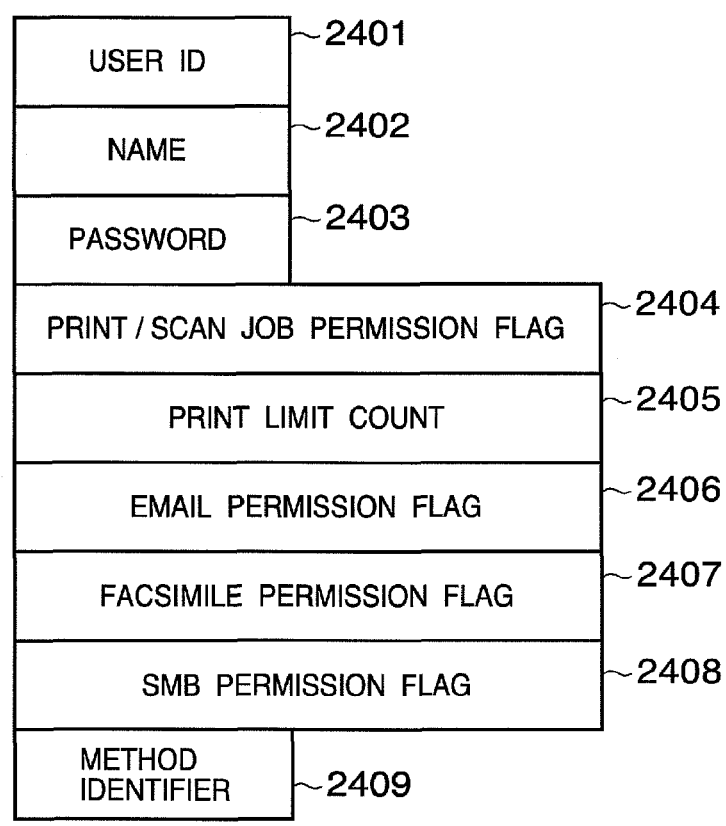
FIG. 24 is a view showing an example of the structure of a record in a user management table.

FIG. 24 shows an example of a user management table. Contents registered in the above-mentioned user registration window are registered in the user management table. FIG. 24 shows one record of the user management table. One record contains a user ID 2401, user name 2402, password 2403, print/scan job permission flag 2404, print limit count 2405, email permission flag 2406, facsimile permission flag 2407, SMB permission flag 2408, and method identifier 2409. Each of the email permission flag 2406, facsimile permission flag 2407, and SMB permission flag 2408 holds a value corresponding to ON/OFF setting in the dialog of FIG. 14. For example, each flag takes a value "0" or "1", and "1" represents permission and "0" represents inhibition. The method identifier 2409 is also called a display method switch, and exhibits how to notify the user of the use restriction of a medium. Details of the method identifier 2409 will be described in a description of the user notification method.

Figure 25:
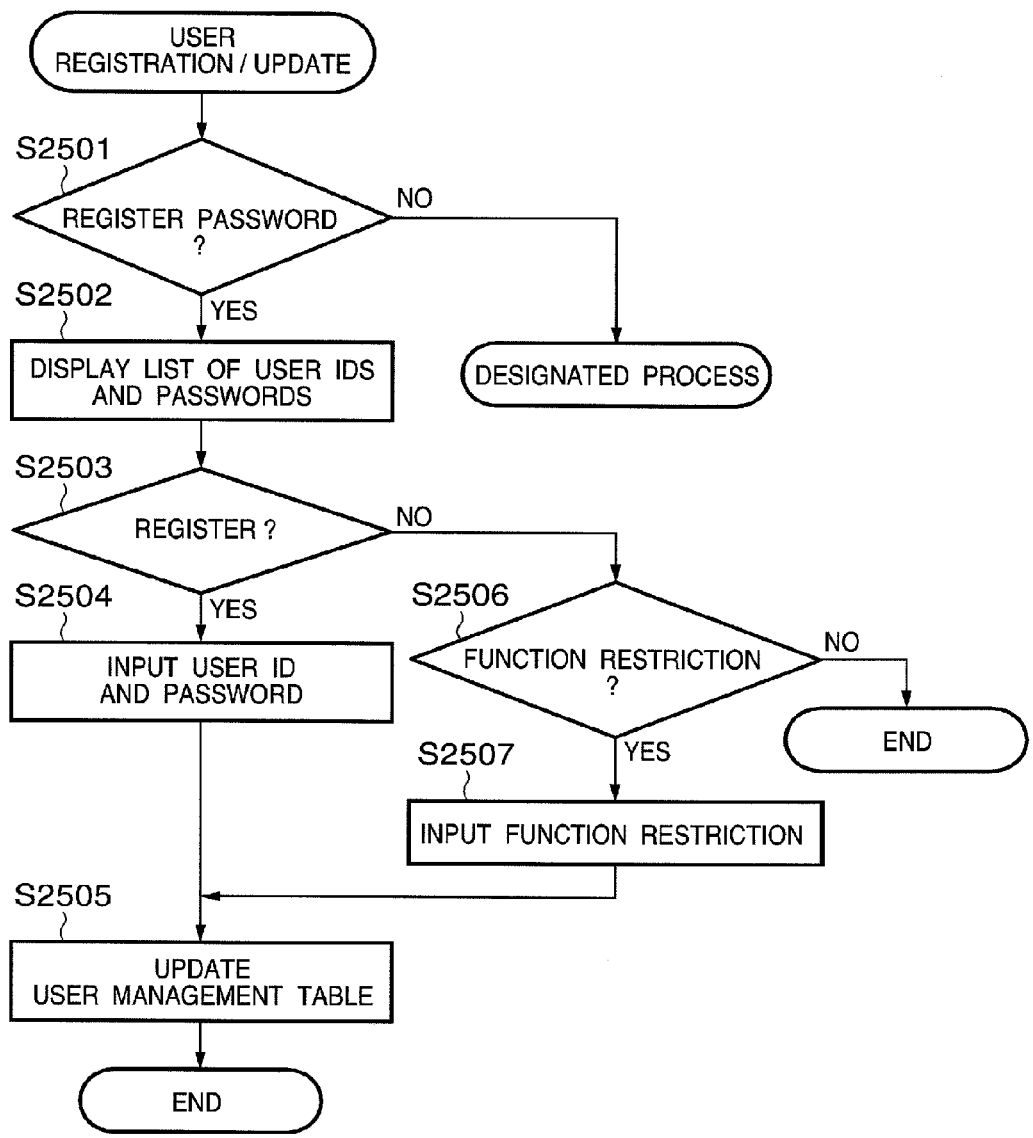
FIG. 25 is a flowchart of procedures to register/update the user management table.

FIG. 25 is a flowchart showing an example of procedures to register and update a user. The control unit 110 executes these procedures.

When the user presses a user registration button on the operation panel, the user registration procedures start, and the control unit 110 displays the UI in FIG. 11. The control unit 110 executes the procedures in FIG. 25 in response to an input from the operator after displaying the window in FIG. 11.

The control unit 110 determines whether the pressed button is the password registration button 1101 (step S2501). If the operator is to register a password, the control unit 110 displays the list window in FIG. 12 (step S2502). The process waits for an input from the operator, and the control unit 110 determines whether the operator presses the registration button 1202 (S2503). If the operator presses the registration button 1202, the control unit 110 displays the dialog in FIG. 13 to allow the operator to input a user ID and password. If the operator presses the OK button, the control unit 110 adds the registered record to the user management table (step S2505).

If the control unit 110 determines in step S2503 that the operator does not press the password registration button, it determines whether he presses the function restriction button 1203 (step S2506). If the operator does not press the function restriction button 1203, the control unit 110 performs a process corresponding to the designated operation, a description of which will be omitted. If the operator presses the function restriction button 1203, the control unit 110 displays the dialog in FIG. 14, and permits the operator to operate the restriction switch (step S2507). After the end of input, the control unit 110 updates the user management table in accordance with the registered contents in step S2505.

By the above procedures, the use authority to use each transmission medium can be set for each user in the user management table. The user does not have use authority for a restricted medium, but has use authority for an unrestricted medium.

<User Notification Method>

Subsequently, a user notification method when the current user does not have authority to use a transmission destination in a transmission operation will be explained. Assume that five destinations of transmission are registered in the address book, as shown in FIG. 15. The five destinations are the destinations of respective transmission media, i.e., FAX, email, Internet FAX, and FTP file transmission, and a grouped destination of these destinations. Although not shown in FIG. 15, the grouped destination contains one destination for each of FAX, email, Internet FAX, and FTP transmission media. A user who attempts transmission does not have use authority for only the FAX transmission medium. That is, the use permission flag is OFF.

Figure 16:
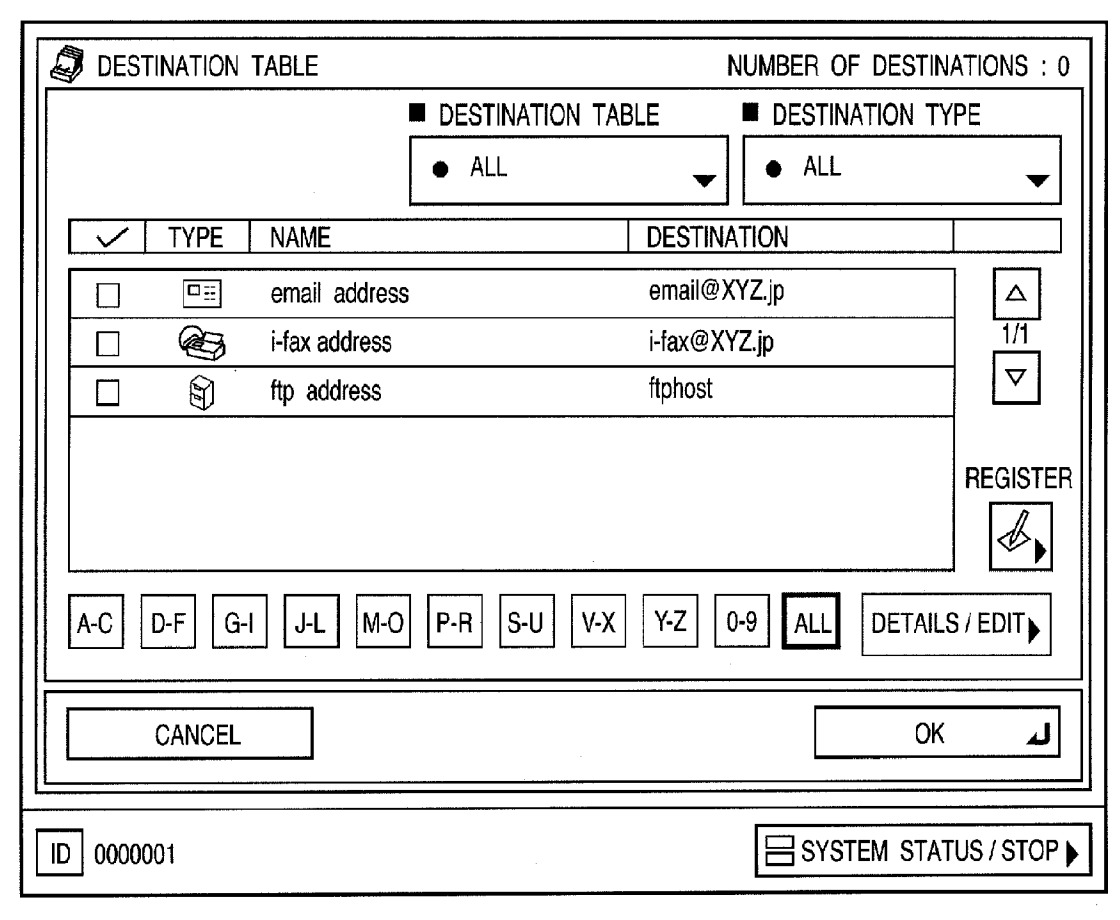

The first notification method will be explained. According to the first method, the destination table list does not exhibit the destination of a transmission medium for which the user does not have authority. In this case, as shown in FIG. 16, the destination table list does not exhibit the facsimile number contained in the address book, and the user cannot see it. Thus, the user cannot select a facsimile as a transmission medium for image transmission. In FIG. 16, the destination table list does not display even the grouped destination because the grouped destination contains the facsimile number, so the user cannot use the grouped destination, too. The administrator sets this state when he wants to hide unnecessary items from the user having no authority. In this way, the first notification method does not display the destination of a transmission medium for which the user does not have use authority.

The second notification method will be explained. According to the second method, a destination for which the user does not have authority is so displayed as to inhibit selection of the destination. FIG. 17 shows an example of this operation window. The FAX destination (facsimile number) and the grouped destination containing the FAX destination are hatched and grayed out. The user can recognize that these destinations are registered, but cannot select them as transmission destinations. The administrator sets this state when the user can ask the administrator to temporarily use a restricted function. The function of providing a selection-inhibited display is prepared in Windows® OS or the like, and can be used to achieve the second method. According to the second method, similar to the first method, the user cannot select a transmission medium for which he does not have authority. However, unlike the first method, the second method allows the user to recognize that there are use-restricted transmission media.

Figure 18:
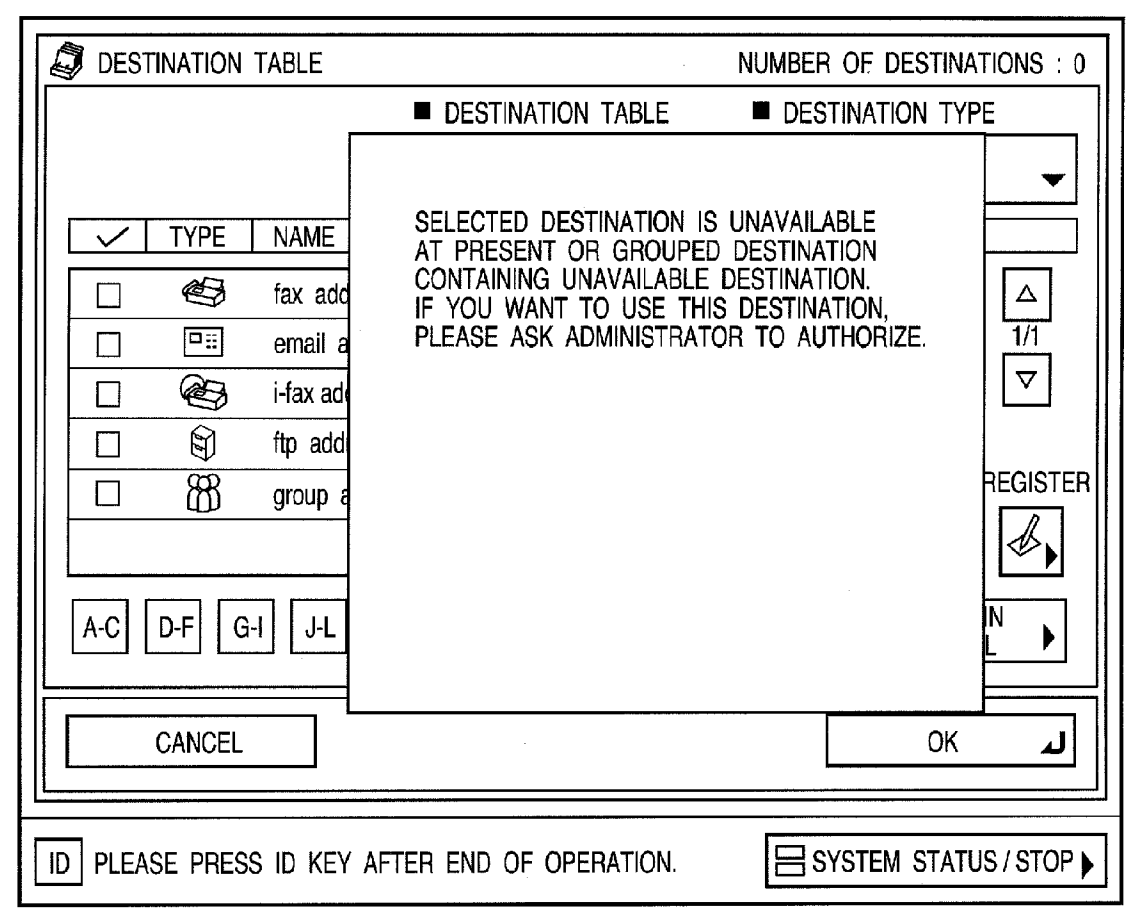

The third method will be explained. According to the third embodiment, a warning is displayed when the user selects the destination of a transmission medium for which the user does not have authority. When the user selects, from the destination list of the destination table, the destination of a transmission medium for which the user does not have authority, a warning dialog is displayed as shown in FIG. 18. Unlike the first and second methods, the user can know from the message the presence of a transmission medium restricted in use and how to cancel the restriction. The user can ask the administrator to temporarily use a use-restricted transmission medium.

Although not shown, the fourth method is also available. According to the fourth method, the user selects an arbitrary destination, and it is determined in executing transmission that transmission fails because of use restriction. The user is notified of the transmission failure by display on the status line and record in the log. This method can be adopted when a user who attempts transmission knows well that the grouped destination contains the destination of a transmission medium for which he does not have authority, and the administrator does not want to display a warning. Which of these notification methods is to be adopted can be selected with a switch in the function setting window of the digital multifunction device. For example, this switch is arranged in the user management window, and a method identifier 2409 representing a method for use is registered in the record of each user in the user management table. For example, a value "1" in the method identifier field 2409 in FIG. 24 means the first method; a value "2", the second method; a value "3", the third method; and a value "4", the fourth method. This setting makes it possible to notify (or not to notify) the user of restriction.

<Destination List Display Procedures>

Figure 19:
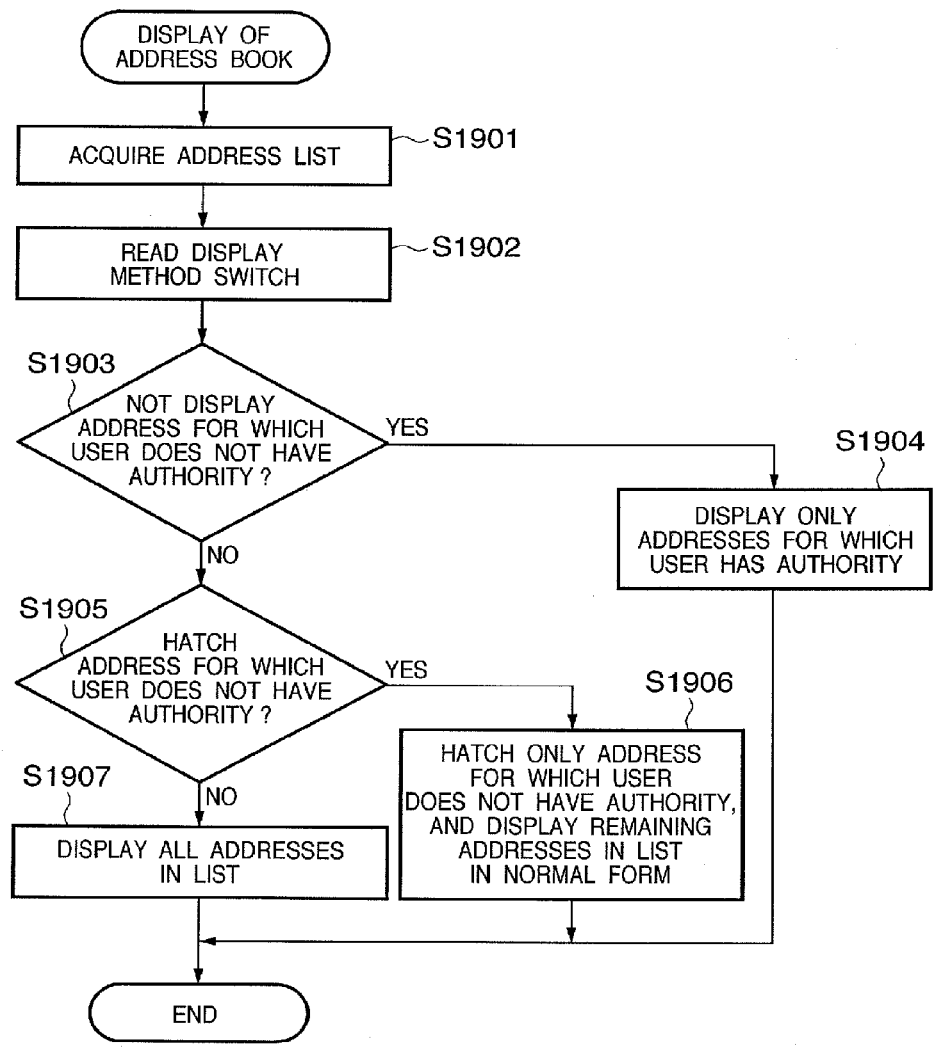
FIG. 19 is a flowchart of a process by a digital multifunction device.

A user notification method and transmission operation when the current user does not have authority to use a destination of transmission will be explained with reference to a flowchart. FIG. 19 is a flowchart associated with a process in the digital multifunction device when the user designates a destination from a transmission destination table. The control unit 110 executes these procedures. On standby, the digital multifunction device 100 displays on the operation unit 150 a window which prompts the user to input an ID. Before executing procedures in FIG. 19, the user logs in to the digital multifunction device. The ID of the login user is saved as the ID of the current user in the RAM or the like.

When the user presses the destination table button 4004 while displaying the transmission window in FIG. 4, the control unit 110 reads out a saved address book from a dedicated area in the hard disk managed by the address book management module 5015 shown in FIG. 3 (S1901). In order to determine the display method, the control unit 110 reads out a record corresponding to the current user ID in the user management table from the internal memory. If the record is saved in the hard disk, the control unit 110 reads out the record from the hard disk. The control unit 110 reads out the method identifier 2409 (i.e., address book display method switch) registered in the record of the current user (S1902). Then, the control unit 110 tests the value of the method identifier 2409.

If the value of the method identifier 2409 represents the first method as a result of the test, the process branches to step S1904. That is, if the control unit 110 determines in step S1903 that it is set not to display the destination of a restricted transmission medium, it displays in the list only the destinations of media for which the current user has use authority, among the readout destination data (S1904). A medium for which the current user has use authority can be determined by referring to the record of the current user (this record will be called the current user record) registered in the user management table. More specifically, the current user has use authority for a transmission medium corresponding to an ON field by referring to the permission flags 2406 to 2408 of respective media in the current user record. When the grouped destination registered in the address book contains the destination of a restricted transmission medium, the control unit 110 does not display the grouped destination, too. For a normal record (FIG. 23A) in the address book, the control unit 110 can determine a transmission medium corresponding to the selected destination on the basis of which field content is selected. When each destination is given an identifier representing the type of medium, the control unit 110 can also determine a transmission medium on the basis of the identifier. For a group address, identification information representing a medium type is registered in correspondence with transmission destination information (see FIG. 23B), and the control unit 110 can specify a medium type on the basis of the medium type 2315a corresponding to a selected destination.

The control unit 110 determines whether the second method is designated, i.e., it is designated to hatch and display the destination of a restricted medium (S1905). If the second method is designated, the control unit 110 hatches and grays out the destination of a restricted medium (i.e., a medium for which the current user does not have use authority) so as to inhibit selection of the destination even if the user selects it (S1906). If the setting of the method identifier 2409 does not satisfy even one of the above conditions, the control unit 110 displays all addresses in the list (S1907).

As a result, the control unit 110 displays the destination list 4002 shown in FIG. 4. When the user selects a desired one of selectable destinations from the destination list 4002 and presses a transmission button (not shown), the control unit 110 attempts to transmit image data to the selected destination. The user designates image data to be transmitted from image data obtained by reading an original image set on the reader unit 200 and image data saved in the hard disk 162. When the first or second method is selected, the control unit 110 presents destinations so as to allow the current user to select only destinations corresponding to transmission media for which the user has authority. In designating a destination of transmission, the user can designate only a destination for which he has transmission authority.

<Transmission Procedures>

Figure 20:
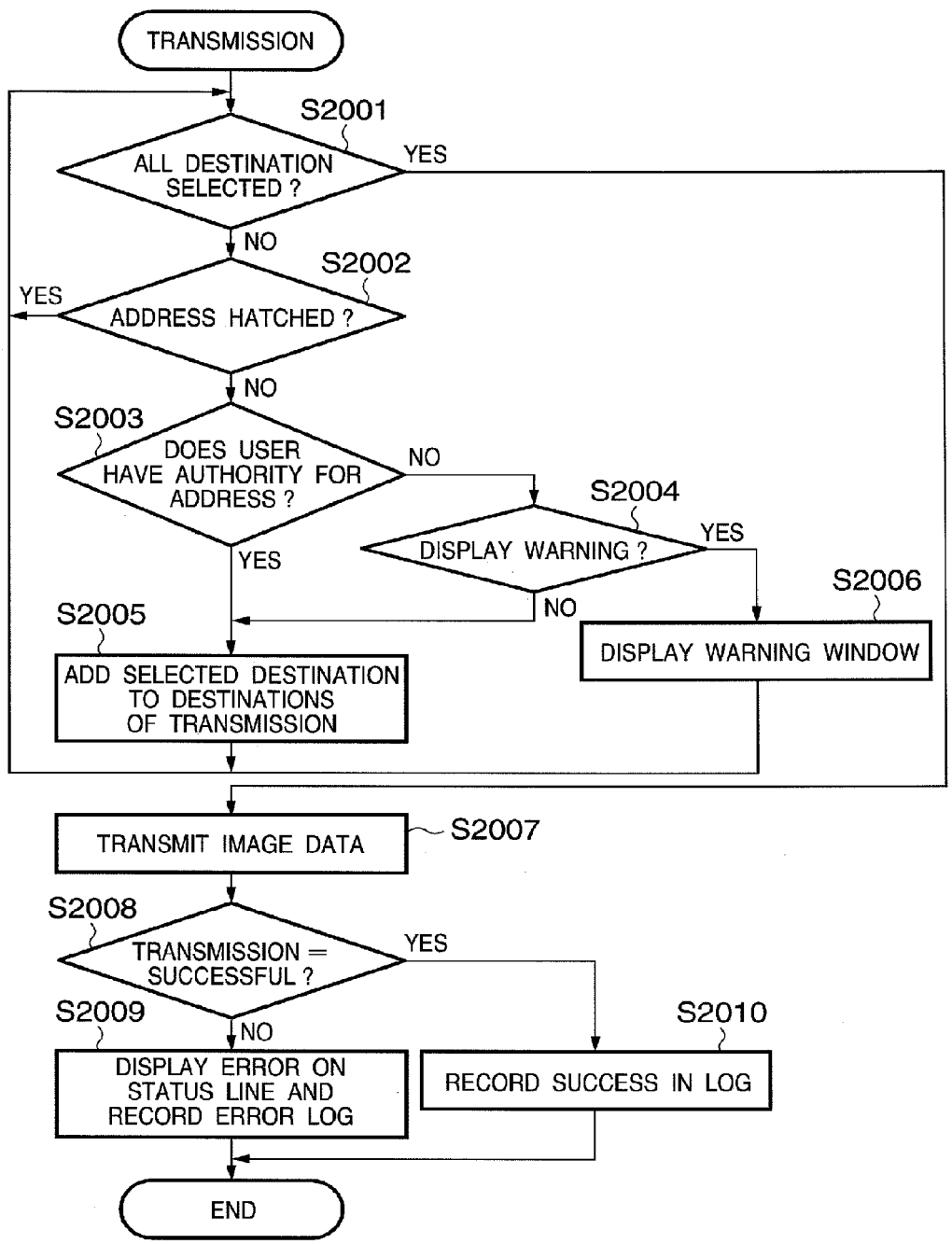
FIG. 20 is a flowchart of a process by the digital multifunction device.

A process until the user selects a destination from an address list in the displayed address book and transmits image data will be explained. FIG. 20 is a flowchart for explaining this process. The control unit 110 executes these procedures.

The control unit 110 waits until the user selects all desired destinations from the list. Since the user can simultaneously designate a plurality of destinations for transmission, the control unit 110 repeats the process until the user selects all destinations (S2001). If a selected destination is hatched and grayed out to inhibit operation, this means that the user cannot use the destination, so the user cannot designate this destination. In this case, the control unit 110 waits again for selection, and the display is kept unchanged (S2002).

The control unit 110 determines whether the selected destination is restricted and cannot be used (S2003). By referring to the current user record registered in the user management table, the control unit 110 can determine a medium for which the current user has use authority. More specifically, the current user has use authority for a transmission medium corresponding to an ON field by referring to the permission flags 2406 to 2408 of respective media in the current user record.

If the current user does not have authority, the control unit 110 determines whether the notification method is the third method of displaying the warning window shown in FIG. 18 and notifying the user that he cannot transmit image data (S2004). If it is set not to display a warning (NO in S2004), the user may be notified whether he can transmit image data, by the log after executing transmission. For this purpose, the control unit 110 adds the selected destination to the transmission destination list, similar to a case of determining that the current user has authority (S2005). The destination of transmission is saved in the memory at least until transmission is complete. If it is set to display a warning (third method), the control unit 110 display the warning window shown in FIG. 18 (S2006). By describing the reason of the transmission failure, troubleshooting, or the like in the warning window, the user can easily grasp the reason or cope with the trouble.

Since the warning window is displayed before executing transmission, the user can also execute an operation again.

The control unit 110 repeats the above process for all destinations selected by the user. For example, pressing the transmission button (not shown) triggers the control unit 110 to transmit image data (S2407).

After transmission, the control unit 110 determines whether transmission is successful (S2408). If transmission is successful, the control unit 110 adds the success log to log information in the digital multifunction device (S2410). If transmission fails, the control unit 110 displays an error message in the status area at the bottom of the operation panel and notifies the user in operation that transmission fails. At the same time, the control unit 110 adds the failure log to log information in the digital multifunction device (S2409). Even if the user moves apart from the apparatus at the start of transmission, he can know the transmission result later.

By the above procedures, the destination list is presented to the user, a warning is displayed, or the user is notified of the transmission result in addition to a selected notification method. The administrator can set use authority to use a transmission medium by each user in the digital multifunction device which can be shared between a plurality of users. In other words, the administrator can manage an available transmission medium for each user. For a medium for which a user does not have use authority, the administrator can also select whether to notify the user of the absence of use authority. Further, the administrator can give a user a suggestion to use a medium for which the user does not have use authority. Instead of notifying a user whether he has use authority, the administrator can also set to notify the user of a failure in a transmission attempt after transmission.

When the grouped destination contains a destination corresponding to a transmission medium for which the current user does not have authority, the administrator can notify the user whether he has authority, according to the above-described four methods. That is, the administrator restricts selection of transmission destinations in the grouped destination or displays a transmission result after transmission.

<Modification>

The embodiment has described an example of restricting data transmission in accordance with user's authority for a destination registered in the address book. However, the present invention can also be applied to a case where the address book does not hold a destination and the user inputs it every transmission (manual transmission). In manual transmission, the user selects a transmission medium for use. At this time, the user record registered in the user management table is referred to, and it is determined whether the user has use authority to use the selected transmission medium. If the user does not have authority, a warning is displayed. In this way, transmission can be restricted by reflecting user's authority even in manual transmission.

In the above description, a transmission process is executed by an operation through the operation unit 150. However, the present invention is not limited to this, and the host computer connected via the LAN 400 may utilize the transmission function of the digital multifunction device 100. In this case, the host computer specifies a user by prompting him to input an ID through a browser or driver software for the multifunction device, and restricts an available transmission medium, similar to the above-described process.

<Other Embodiments>

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-288154 filed on Sep. 30, 2005, which is hereby incorporated by reference herein in its entirety.

What is claimed is:

1. A data transmission apparatus that uses a plurality of types of transmission media, which transmits data using at least one of the plurality of types of transmission media, the apparatus comprising:

a processor coupled to a memory and programmed to function as:

a destination storage unit configured to store a group destination including a plurality of individual destinations and respective types of transmission media associated with the individual destinations, wherein the group destination is defined to handle the plurality of individual destinations as one destination; and a transmission controller that identifies a restricted type of transmission medium for which a current user does not have use authority, by referring to an authority storage unit that stores authority information representing each of a plurality of users' use authorities to use one of the plurality of types of transmission media for transmitting data, and that restricts transmission of data to a group destination including an individual destination to which the restricted type of transmission medium is associated, wherein the transmission controller notifies the user by a selected one of a plurality of notification methods that data transmission using the group destination is restricted, the group destination including an individual destination to which the restricted type of transmission medium is associated, and wherein the plurality of types of transmission media includes at least one of:

email, facsimile (FAX), file transfer protocol (FTP), and server message block (SMB).

2. The apparatus according to claim 1, wherein, when the current user inputs an instruction to display a list of destinations stored in the destination storage unit, the transmission controller displays, as one of the plurality of notification methods, a list of group destinations so as to inhibit the current user from selecting, from the group destinations stored in the destination storage unit, a group destination containing at least one destination associated with the restricted type of transmission medium, and transmits data to a group destination selected from the group destinations displayed in the list.

3. The apparatus according to claim 2, wherein the transmission controller displays, as one of the plurality of notification methods, the list of group destinations from which a group destination containing at least one destination associated with the restricted type of transmission medium is excluded.

4. The apparatus according to claim 2, wherein the transmission controller displays, as one of the plurality of notification methods, in a selection-inhibited form, a group destination containing at least one destination associated with the restricted type of transmission medium.

5. The apparatus according to claim 2, wherein the transmission controller outputs, as one of the plurality of notification methods, a warning when an attempt is made to select a group destination containing at least one destination associated with the restricted type of transmission medium.

6. The apparatus according to claim 1, wherein when a group destination contains at least one destination associated with the restricted type of transmission medium, the transmission controller displays, as one of the plurality of notification methods, a list of destinations so as to inhibit the current user from selecting the group destination, and transmits data to a destination selected from the destinations displayed in the list.

7. The apparatus according to claim 1, wherein the transmission controller outputs, as one of the plurality of notification methods, a message that transmission is restricted, without transmitting data to a group destination that contains at least one destination associated with the restricted type of transmission medium.

8. The apparatus according to claim 1, wherein the processor is programmed to function as a reader that reads an original image as image data, wherein the image data read by the reader can be transmitted by the plurality of types of transmission media.

9. The apparatus according to claim 1, wherein the processor is programmed to function as:

an address book maintenance unit that maintains the group destination stored in the destination storage unit; and a user management unit that maintains the authority information.

10. The apparatus according to claim 1, wherein the apparatus is incorporated in an image input and/or output apparatus that includes an image forming unit that outputs image data as an image onto a print medium.

11. A method of controlling a data transmission apparatus that uses a plurality of types of transmission media and that transmits data using at least one of the plurality of types of transmission media, the method comprising:

storing, in a destination storage unit, a group destination including a plurality of individual destinations and respective types of transmission media associated with the individual destinations, wherein the group destination is defined to handle the plurality of individual destinations as one destination;

identifying a restricted type of transmission medium for which a current user does not have use authority, by referring to an authority storage unit that stores authority information representing each of a plurality of users' use authorities to use one of the plurality of types of transmission media for transmitting data;

restricting transmission of data to a group destination including an individual destination to which the restricted type of transmission medium is associated; and notifying the user by a selected one of a plurality of notification methods that data transmission using the group destination is restricted, the group destination including an individual destination to which the restricted type of transmission medium is associated, wherein the plurality of types of transmission media includes at least one of: email, facsimile (FAX), file transfer protocol (FTP), and server message block (SMB).

12. A non-transitory computer-readable medium having stored thereon a program that, when executed by a computer causes the computer to control a data transmission apparatus that uses a plurality of types of transmission media and that transmits data using at least one of the plurality of types of transmission media, the program comprising:

code for accessing, from a destination storage unit, a group destination including a plurality of individual destinations and respective types of transmission media associated with the individual destinations, wherein the group destination is defined to handle the plurality of individual destinations as one destination; and code for identifying a restricted type of transmission medium for which a current user does not have use authority, by referring to an authority storage unit that stores authority information representing each of a plurality of users' use authorities to use one of the plurality of types of transmission media for transmitting data;

code for restricting transmission of data to a group destination including an individual destination to which the restricted type of transmission medium is associated; and code for notifying the user by a selected one of a plurality of notification methods that data transmission using the group destination is restricted, the group destination including an individual destination to which the restricted type of transmission medium is associated, wherein the plurality of types of transmission media includes at least one of: email, facsimile (FAX), file transfer protocol (FTP), and server message block (SMB).

\* \* \* \* \*